US012726766B2

(12) United States Patent
Lee et al.

(10) Patent No.: US 12,726,766 B2
(45) Date of Patent: Sep. 1, 2026

(54) WIRELESS AUDIO RECEIVING DEVICE, WIRELESS AUDIO TRANSMITTING DEVICE, AND WIRELESS AUDIO SYSTEM INCLUDING THE SAME

(71) Applicant: LG ELECTRONICS INC., Seoul (KR)

(72) Inventors: Seunghyun Lee, Seoul (KR); Jisung Yang, Seoul (KR); Joonseok Maeng, Seoul (KR); Jinseong Lee, Seoul (KR); Dawoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 18/673,810

(22) Filed: May 24, 2024

(65) Prior Publication Data

US 2025/0142257 A1 May 1, 2025

(30) Foreign Application Priority Data

Nov. 1, 2023 (KR) ........................ 10-2023-0149254

(51) Int. Cl.
*H04R 3/12* (2006.01)

(52) U.S. Cl.
CPC ........... *H04R 3/12* (2013.01); *H04R 2420/07* (2013.01)

(58) Field of Classification Search
CPC .............................. H04R 3/12; H04R 2420/07
USPC ...................................................... 381/77–82
See application file for complete search history.

(56) References Cited

U.S. PATENT DOCUMENTS

| | | | | |
|---|---|---|---|---|
| 10,123,142 | B2 * | 11/2018 | Lee | H04S 7/308 |
| 11,019,438 | B2 * | 5/2021 | Mayman | H04R 27/00 |
| 11,706,576 | B2 * | 7/2023 | Mayman | H04R 3/00 381/77 |
| 12,224,792 | B2 * | 2/2025 | Zhao | H04B 1/7163 |
| 12,232,034 | B2 * | 2/2025 | Son | H04W 52/0235 |
| 12,349,217 | B2 * | 7/2025 | Jang | H04L 5/0057 |
| 12,457,450 | B2 * | 10/2025 | Ahmed | H04W 64/006 |
| 2008/0226094 | A1 | 9/2008 | Rutschman | |
| 2020/0100029 | A1 | 3/2020 | Watson et al. | |

(Continued)

FOREIGN PATENT DOCUMENTS

| | | | |
|---|---|---|---|
| KR | 10-2013-0030476 | A | 3/2013 |
| KR | 10-2015-0135832 | A | 12/2015 |
| KR | 10-2021-0008139 | A | 1/2021 |

(Continued)

*Primary Examiner* — Disler Paul
(74) *Attorney, Agent, or Firm* — Birch, Stewart, Kolasch & Birch, LLP

(57) ABSTRACT

A wireless audio receiving device, a wireless audio transmitting device, and a wireless audio output system including the same are disclosed. The wireless audio receiving device according to an embodiment of the present disclosure includes a transceiver to receive an audio signal from a wireless audio transmitting device through ultra-wideband communication; and a sound output device to output sound corresponding to the audio signal, wherein the transceiver receives an audio signal of a first channel, and, based on a relay mode, receives an audio signal of a second channel, and transmits the audio signal of the second channel or an audio signal processed based on the audio signal to a second wireless audio receiving device. Accordingly, it is possible to relay audio signals through ultra-wideband communication.

18 Claims, 28 Drawing Sheets

(56) References Cited

U.S. PATENT DOCUMENTS

| | | | | |
|---|---|---|---|---|
| 2023/0006711 | A1 | 1/2023 | Zhao | |
| 2025/0063301 | A1 * | 2/2025 | Jeong | H04W 28/06 |

FOREIGN PATENT DOCUMENTS

| | | | |
|---|---|---|---|
| KR | 10-2022-0094863 | A | 7/2022 |
| KR | 10-2022-0133965 | A | 10/2022 |
| KR | 10-2023-0073257 | A | 5/2023 |
| WO | WO 2022/154257 | A1 | 7/2022 |

* cited by examiner

WIRELESS AUDIO RECEIVING DEVICE, WIRELESS AUDIO TRANSMITTING DEVICE, AND WIRELESS AUDIO SYSTEM INCLUDING THE SAME

CROSS REFERENCE TO RELATED APPLICATIONS

This non-provisional application claims the benefit under 35 U.S.C. § 119(a) to Patent Application No. 10-2023-0149254, filed in the Republic of Korea on Nov. 11, 2023, which is hereby expressly incorporated by reference into the present application.

BACKGROUND

1. Field

This disclosure relates to a wireless audio receiving device, a wireless audio transmitting device, and a wireless audio output system including the same, and more particularly, to a wireless audio receiving device, a wireless audio transmitting device, and a wireless audio output system including the same capable of relaying audio signals through ultra-wideband communication.

2. Description of the Related Art

A wireless audio transmitting device wirelessly transmits an audio signal to an external wireless audio receiving device.

In response to this, a wireless audio receiving device wirelessly receives an audio signal from an external wireless audio transmitting device, converts the received audio signal into sound, and outputs the sound.

Meanwhile, in order to avoid interference with surrounding signals or output high-quality sound, research using an ultra-wideband (UWB) communication method between a wireless audio transmitting device and a wireless audio receiving device is being conducted.

Meanwhile, in a case of transmitting audio signals through ultra-wideband communication, there is a problem in that audio signals of some channels cannot be stably transmitted due to surrounding obstacles, etc.

SUMMARY

The disclosure has been made in view of the above problems, and may provide a wireless audio receiving device, a wireless audio transmitting device, and a wireless audio output system including the same that can relay audio signals through ultra-wideband communication.

The disclosure may further provide a wireless audio receiving device, a wireless audio transmitting device, and a wireless audio output system including the same that can perform stable wireless audio playback through ultra-wideband communication.

The disclosure may further provide a wireless audio receiving device, a wireless audio transmitting device, and a wireless audio output system including the same that can quickly relay audio signals through ultra-wideband communication without separate device-to-device connection.

In accordance with an aspect of the present disclosure, a wireless audio receiving device includes: a transceiver configured to receive an audio signal from a wireless audio transmitting device through ultra-wideband communication; and a sound output device configured to output sound corresponding to the audio signal from the transceiver, wherein the transceiver receives an audio signal of a first channel from the wireless audio transmitting device, and, based on a relay mode, receives an audio signal of a second channel from the wireless audio transmitting device, and transmits the audio signal of the second channel or an audio signal processed based on the audio signal of the second channel to a second wireless audio receiving device.

Meanwhile, the transceiver may transmit a first confirmation message to the wireless audio transmitting device, after receiving the audio signal of the first channel.

Meanwhile, in the case of a first relay mode among the relay mode, the transceiver may transmit the audio signal of the second channel intactly to the second wireless audio receiving device.

Meanwhile, in a case of a second relay mode among the relay mode, the transceiver may transmit an audio signal processed based on the audio signal of the second channel to the second wireless audio receiving device.

Meanwhile, in a case of a second relay mode among the relay mode, the transceiver may transmit a second confirmation message to the wireless audio transmitting device, after receiving the audio signal of the second channel, and transmit an audio signal processed based on the audio signal of the second channel to the second wireless audio receiving device, after transmitting the second confirmation message.

Meanwhile, based on added relay mode information while receiving the audio signal of the second channel, the transceiver may transmit the audio signal of the second channel intactly to the second wireless audio receiving device, or transmit an audio signal processed based on the audio signal of the second channel to the second wireless audio receiving device.

Meanwhile, in a case of a first relay mode, the transceiver may transmit the audio signal of the second channel intactly to the second wireless audio receiving device, based on data in a media access control layer, and in a case of a second relay mode, transmit an audio signal processed based on the audio signal of the second channel to the second wireless audio receiving device, based on data in an application layer.

Meanwhile, in a case of transmitting the audio signal of the second channel intactly to the second wireless audio receiving device, the transceiver may transmit together with a reference signal including offset information spaced apart by a predetermined interval from a beacon signal.

Meanwhile, in a case of transmitting an audio signal processed based on the audio signal of the second channel to the second wireless audio receiving device, the transceiver may transmit together with a reference signal including offset information spaced apart by a predetermined interval from a beacon signal.

In accordance with another aspect of the present disclosure, a wireless audio transmitting device includes a transceiver configured to transmit an audio signal to at least one wireless audio receiving device through ultra-wideband communication, wherein the transceiver transmits an audio signal of a first channel to a first wireless audio receiving device, and transmits an audio signal of a second channel to a second wireless audio receiving device, and in case in which a confirmation message is not received from the second wireless audio receiving device within a predetermined time, enters a relay mode and transmits the audio signal of the second channel to the first wireless audio receiving device.

Meanwhile, in the relay mode, the transceiver may set a target address of the audio signal of the second channel to the first wireless audio receiving device or the first wireless audio receiving device.

Meanwhile, in a case of a first relay mode among the relay mode, the transceiver may set a target address of the audio signal of the second channel to the second wireless audio receiving device, and, in a case of a second relay mode among the relay mode, set a target address of the audio signal of the second channel to the first wireless audio receiving device.

Meanwhile, the transceiver may receive a first confirmation message from the first wireless audio receiving device, after transmitting the audio signal of the first channel.

Meanwhile, in a case of a first relay mode among the relay mode, the transceiver may not receive a confirmation message within a predetermined time, after transmitting the audio signal of the second channel to the first wireless audio receiving device, and, in a case of a second relay mode among the relay mode, receive a second confirmation message, after transmitting the audio signal of the second channel to the first wireless audio receiving device.

Meanwhile, wherein the transceiver may further transmit relay mode information, in a case of transmitting the audio signal of the second channel.

Meanwhile, in a case of a first relay mode among the relay mode, the transceiver may add first relay mode information to a media access control layer, and, in a case of a second relay mode among the relay mode, add second relay mode information in an application layer.

In accordance with another aspect of the present disclosure, a wireless audio output system includes a wireless audio receiving device and a wireless audio transmitting device, wherein the wireless audio receiving device includes a transceiver for receiving an audio signal from a wireless audio transmitting device through an ultra-wideband communication, and a sound output device for outputting a sound corresponding to the audio signal from the transceiver, wherein the transceiver: receives an audio signal of a first channel from the wireless audio transmitting device; receives an audio signal of a second channel from the wireless audio transmitting device, based on a relay mode; and transmits the audio signal of the second channel or an audio signal processed based on the audio signal of the second channel to a second wireless audio receiving device.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Hereinafter, the present disclosure will be described in more detail with reference to the drawings.

The suffixes such as "module" and "unit" may be used to refer to elements or components. Use of such suffixes herein is merely intended to facilitate description of the specification, and the suffixes do not have any special meaning or function. Accordingly, the "module" and "unit" may be used interchangeably.

FIGS. 1A to 1E are diagrams illustrating a wireless audio system including a wireless audio receiving device and a wireless audio transmitting device according to various embodiments of the present disclosure.

Figure 1A:
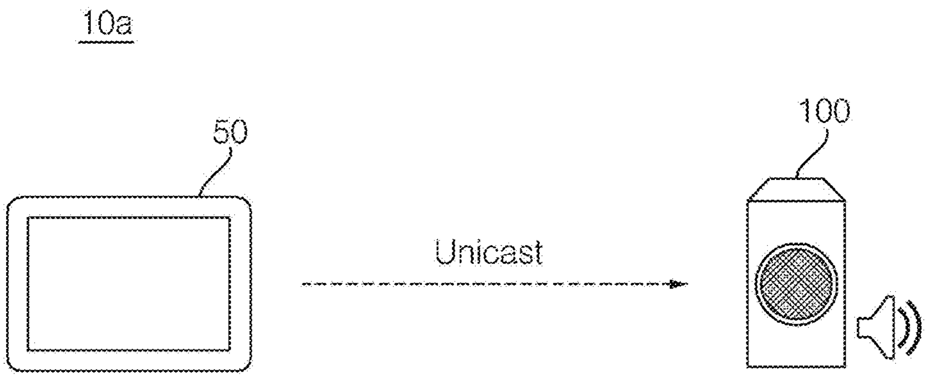
FIGS. 1A to 1E are diagrams illustrating a wireless audio system including a wireless audio receiving device and a wireless audio transmitting device according to various embodiments of the present disclosure.

First, FIG. 1A illustrates a wireless audio system 10*a* according to an embodiment of the present disclosure.

Referring to FIG. 1A, the wireless audio system 10*a* according to an embodiment of the present disclosure may include a wireless audio transmitting device 50 and a wireless audio receiving device 100.

In particular, in the wireless audio system 10*a*, the wireless audio transmitting device 50 and the wireless audio receiving device 100 may correspond one-to-one, based on a unicast method.

The wireless audio transmitting device 50 may include a first communication module 135*a* wirelessly transmitting a first audio signal according to a first communication standard of a first frequency band, and a second communication module 135*b* wirelessly transmitting a second audio signal according to a second communication standard of a second frequency band greater than the first frequency band.

Meanwhile, the wireless audio receiving device 100 may include a first communication module 135*a* wirelessly receiving a first audio signal according to a first communication standard of a first frequency band, and a second communication module 135*b* wirelessly receiving a second audio signal according to a second communication standard of a second frequency band greater than the first frequency band.

For example, the wireless audio receiving device 100 may wirelessly output a first sound based on a first audio signal according to a first communication standard of a first frequency band received by the first communication module 135*a*, and when the wireless environment is complicated and the packet error rate of the first audio signal is greater than or equal to a certain value, may output a second sound, based on a second audio signal wirelessly according to the second communication standard of a second frequency band received by the second communication module 135*b*.

Accordingly, even though the wireless environment is complicated, it is possible to stably receive audio wirelessly and output sound.

Meanwhile, the wireless audio receiving device 100 receives a beacon signal from a first wireless audio transmitting device 50*a* every period Pc corresponding to a first active period Pa and a first inactive period Pb, and searches for an additional device during the first inactive period Pb. When receiving a second beacon signal from a second wireless audio transmitting device 50*b*, the wireless audio receiving device 100 transmits a connection request command to the second wireless audio transmitting device 50*b*, and based on the connection request command, additionally wirelessly connects to the second wireless audio transmitting device 50*b* based on ultra-wideband communication, during wireless connection with the first wireless audio transmitting device 50*a* based on ultra-wideband communication.

Accordingly, it is possible to perform frequency hopping in ultra-wideband communication, by using a beacon signal.

Figure 1B:
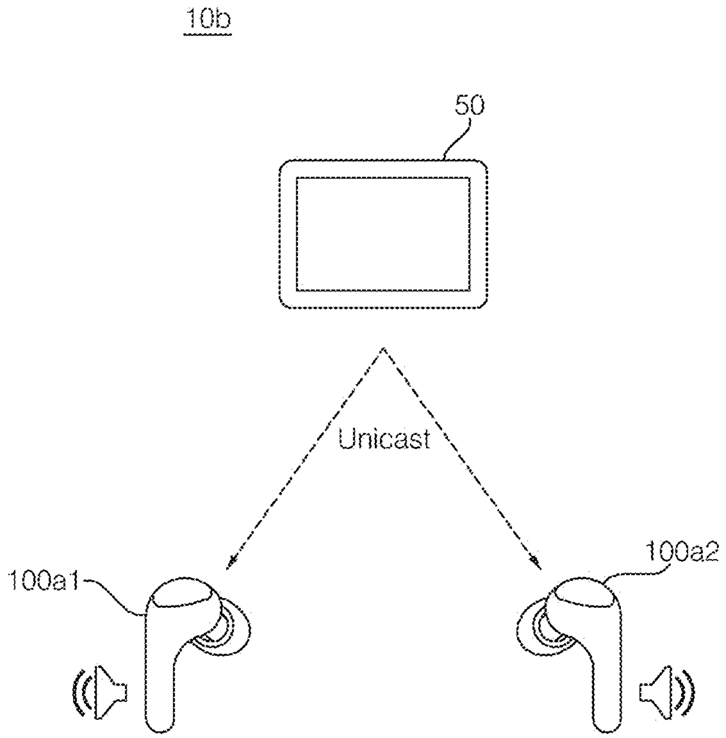

Next, FIG. 1B illustrates a wireless audio system 10*b* according to another embodiment of the present disclosure.

Referring to FIG. 1B, the wireless audio system 10*b* according to another embodiment of the present disclosure may include a wireless audio transmitting device 50 and a plurality of wireless audio receiving devices 100*a*1 and 100*a*2.

In particular, the wireless audio system 10*b* may include a wireless audio transmitting device 50 and a plurality of wireless audio receiving devices 100*a*1 and 100*a*2, based on a unicast method.

For example, when wireless audio signals of a first channel to a second channel are output from the wireless audio transmitting device 50, a wireless audio signal of the first channel may be transmitted to a first wireless audio receiving device 100*a*1 among a plurality of wireless audio receiving devices 100*a*1 and 100*a*2, and a wireless audio signal of the second channel may be transmitted to a second wireless audio receiving device 100*a*2. Accordingly, even though the wireless environment is complicated, it is possible to stably receive audio wirelessly and output sound.

Meanwhile, each of the wireless audio receiving devices 100*a*1 to 100*a*2 wirelessly outputs a first sound, based on a first audio signal according to a first communication standard of a first frequency band received by a first communication module 135*a*. In response to a packet error rate of the first audio signal is greater than or equal to a certain value as the wireless environment is complicated, each of the wireless audio receiving devices 100*a*1 to 100*a*2 may output a second sound, based on a second audio signal according to a second communication standard of a second frequency band received by a second communication module 135*b*. Accordingly, even though the wireless environment is complicated, it is possible to stably receive audio wirelessly and output sound.

Meanwhile, each of the wireless audio receiving devices 100*a*1 to 100*a*2 receives a beacon signal from a first wireless audio transmitting device 50*a* every period Pc corresponding to a first active period Pa and a first inactive period Pb, and searches for an additional device during the first inactive period Pb. When receiving a second beacon signal from a second wireless audio transmitting device 50*b*, each of the wireless audio receiving devices 100*a*1 to 100*a*2 transmits a connection request command to the second wireless audio transmitting device 50*b*, and based on the connection request command, additionally wirelessly connects to the second wireless audio transmitting device 50*b* based on ultra-wideband communication, during wireless connection with the first wireless audio transmitting device 50*a* based on ultra-wideband communication. Accordingly, it is possible to perform frequency hopping in ultra-wideband communication, by using a beacon signal.

At this time, the plurality of wireless audio receiving devices 100*a*1 and 100*a*2 may be left and right wireless audio receiving devices, respectively.

Figure 1C:
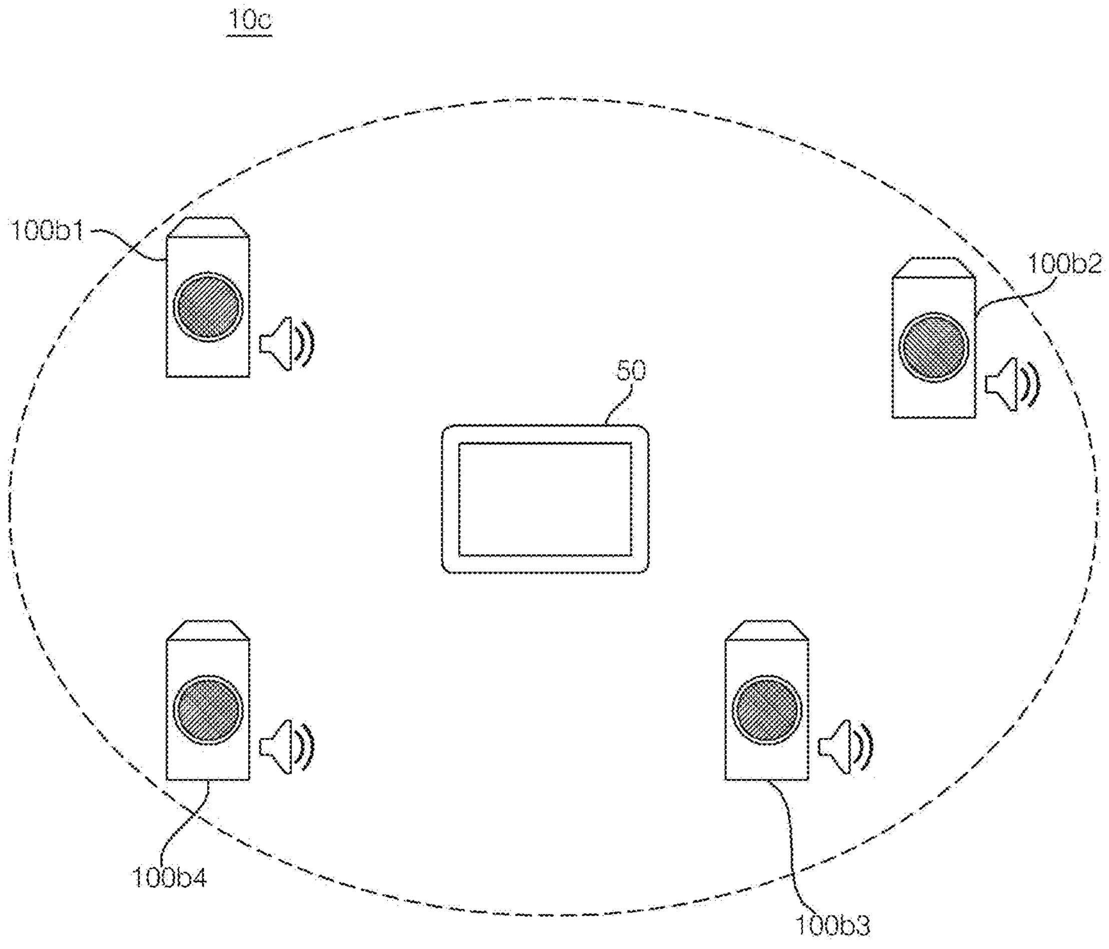

Next, FIG. 1C illustrates a wireless audio system 10*c* according to another embodiment of the present disclosure.

Referring to FIG. 1C, a wireless audio system 10*c* according to another embodiment of the present disclosure may include a wireless audio transmitting device 50 and a plurality of wireless audio receiving devices 100*b*1 to 100*b*4.

In particular, the wireless audio system 10*c* may include a wireless audio transmitting device 50 and a plurality of wireless audio receiving devices 100*b*1 to 100*b*4, based on a broadcast method.

For example, when wireless audio signals of first to fourth channels are output from the wireless audio transmitting device 50, a wireless audio signal of a first channel may be transmitted to a first wireless audio receiving device 100*b*1 among a plurality of wireless audio receiving devices 100*b*1 to 100*b*4, a wireless audio signal of a second channel may be transmitted to a second wireless audio receiving device 100*b*2, a wireless audio signal of a third channel may be transmitted to a third wireless audio receiving device 100*b*3, and a wireless audio signal of a fourth channel may be transmitted to a fourth wireless audio receiving device 100*b*4. Accordingly, even though the wireless environment is complicated, it is possible to stably receive audio wirelessly and output sound.

Meanwhile, each of the wireless audio receiving devices 100*b*1 to 100*b*4 wirelessly outputs a first sound, based on a first audio signal according to a first communication standard of a first frequency band received by the first communication module 135*a*. In response to a packet error rate of the first audio signal is greater than or equal to a certain value as the wireless environment is complicated, each of the wireless audio receiving devices 100*b*1 to 100*b*4 may output a second sound, based on a second audio signal according to a second communication standard of a second frequency band received by the second communication module 135*b*. Accordingly, even though the wireless environment is complicated, it is possible to stably receive audio wirelessly and output sound.

Meanwhile, each of the wireless audio receiving devices 100*b*1 to 100*b*4 receives a beacon signal from a first wireless audio transmitting device 50*a* every period Pc corresponding to a first active period Pa and a first inactive period Pb, and searches for an additional device during the first inactive period Pb. When receiving a second beacon signal from a second wireless audio transmitting device 50*b*, each of the wireless audio receiving devices 100*b*1 to 100*b*4 transmits a connection request command to the second wireless audio transmitting device 50*b*, and based on the connection request command, additionally wirelessly connects to the second wireless audio transmitting device 50*b* based on ultra-wideband communication, during wireless connection with the first wireless audio transmitting device 50*a* based on ultra-wideband communication. Accordingly, it is possible to perform frequency hopping in ultra-wideband communication, by using a beacon signal.

Figure 1D:
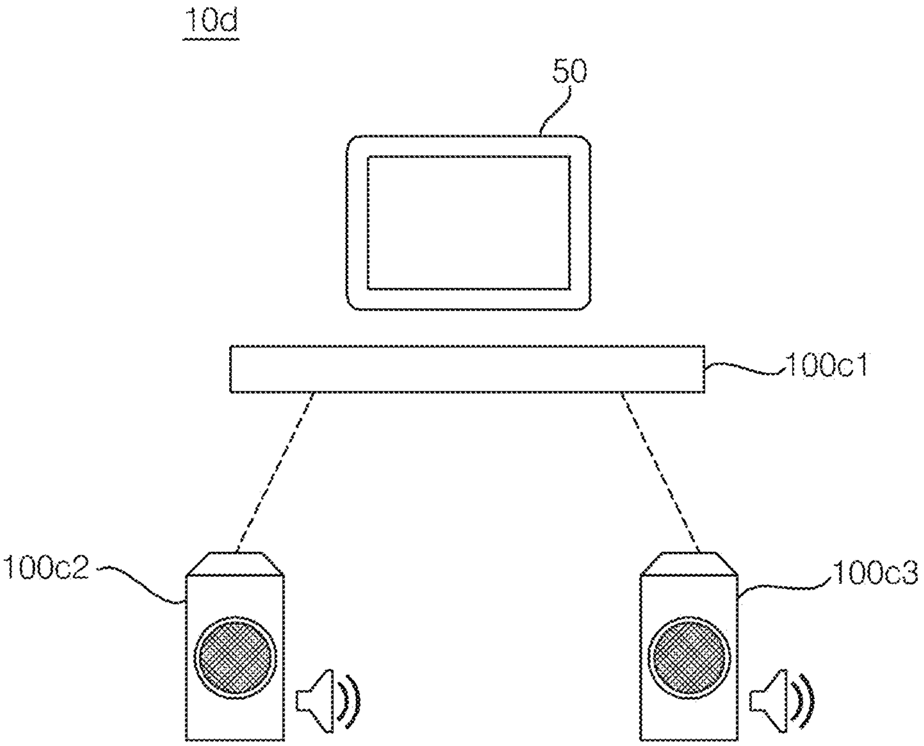

Next, FIG. 1D illustrates a wireless audio system 10*d* according to another embodiment of the present disclosure.

Referring to FIG. 1D, the wireless audio system 10*d* according to another embodiment of the present disclosure may include a wireless audio transmitting device 50 and a plurality of wireless audio receiving devices 100*c*1 to 100*c*3.

In particular, the wireless audio system 10*d* may include a wireless audio transmitting device 50 and a plurality of wireless audio receiving devices 100*cl* to 100*c*3, based on a unicast method.

For example, when wireless audio signals of first to third channels are output from the wireless audio transmitting device 50, a wireless audio signal of a first channel may be transmitted to a first wireless audio receiving device 100*c*1 among a plurality of wireless audio receiving devices 100*c*1 to 100*c*3, a wireless audio signal of a second channel may be transmitted to a second wireless audio receiving device 100*c*2, and a wireless audio signal of a third channel may be transmitted to a third wireless audio receiving device 100*c*3.

As another example, when wireless audio signals of first to third channels are output from the wireless audio transmitting device 50, wireless audio signals of a first channel to a third channel may be transmitted to a first wireless audio receiving device 100*cl* among a plurality of wireless audio receiving devices 100*cl* to 100*c*3, the first wireless audio receiving device 100*c*1 may output wireless audio signals of second to third channels, a wireless audio signal of the second channel may be transmitted to a second wireless audio receiving device 100*c*2, and a wireless audio signal of the third channel may be transmitted to a third wireless audio receiving device 100*c*3.

Accordingly, even though the wireless environment is complicated, it is possible to stably receive audio wirelessly and output sound.

Meanwhile, each of the wireless audio receiving devices 100*c*1 to 100*c*3 wirelessly outputs a first sound, based on a first audio signal according to a first communication standard of a first frequency band received by the first communication module 135*a*. In response to a packet error rate of the first audio signal is greater than or equal to a certain value as the wireless environment is complicated, each of the wireless audio receiving devices 100*c*1 to 100*c*3 may output a second sound, based on a second audio signal according to a second communication standard of a second frequency band received by the second communication module 135*b*. Accordingly, even though the wireless environment is complicated, it is possible to stably receive audio wirelessly and output sound.

Meanwhile, each of the wireless audio receiving devices 100*c*1 to 100*c*3 receives a beacon signal from a first wireless audio transmitting device 50*a* every period Pc corresponding to a first active period Pa and a first inactive period Pb, and searches for an additional device during the first inactive period Pb.

When receiving a second beacon signal from a second wireless audio transmitting device 50*b*, each of the wireless audio receiving devices 100*c*1 to 100*c*3 transmits a connection request command to the second wireless audio transmitting device 50*b*, and based on the connection request command, additionally wirelessly connects to the second wireless audio transmitting device 50*b* based on ultra-wideband communication, during wireless connection with the first wireless audio transmitting device 50*a* based on ultra-wideband communication. Accordingly, it is possible to perform frequency hopping in ultra-wideband communication, by using a beacon signal.

Figure 1E:
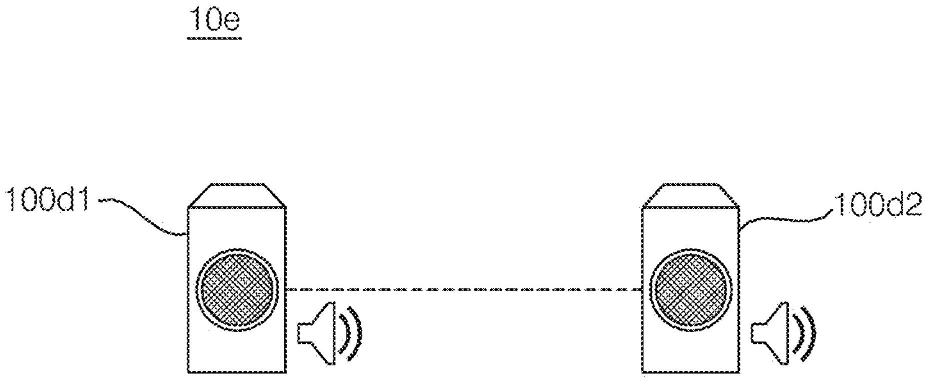

Next, FIG. 1E illustrates a wireless audio system 10*e* according to another embodiment of the present disclosure.

Referring to FIG. 1E, a wireless audio system 10*e* according to another embodiment of the present disclosure may include a plurality of wireless audio receiving devices 100*d*1 and 100*d*2.

In particular, the wireless audio system 10*e* may include a plurality of wireless audio receiving devices 100*d*1 and 100*d*2, based on a unicast method.

For example, when a wireless audio signal is output from the first wireless audio receiving device 100*d*1, the wireless audio signal may be transmitted to the second wireless audio receiving device 100*d*2.

Accordingly, even though the wireless environment is complicated, it is possible to stably receive audio wirelessly and output sound.

Meanwhile, each of the wireless audio receiving devices 100*d*1 and 100*d*2 wirelessly outputs a first sound, based on a first audio signal according to a first communication standard of a first frequency band received by the first communication module 135*a*. In response to a packet error rate of the first audio signal is greater than or equal to a certain value as the wireless environment is complicated, each of the wireless audio receiving devices 100*d*1 and 100*d*2 may output a second sound, based on a second audio signal according to a second communication standard of a second frequency band received by the second communication module 135*b*. Accordingly, even though the wireless environment is complicated, it is possible to stably receive audio wirelessly and output sound.

Meanwhile, each of the wireless audio receiving devices 100*d*1 and 100*d*2 receives a beacon signal from a first wireless audio transmitting device 50*a* every period Pc corresponding to a first active period Pa and a first inactive period Pb, and searches for an additional device during the first inactive period Pb. When receiving a second beacon signal from a second wireless audio transmitting device 50*b*, each of the wireless audio receiving devices 100*d*1 and 100*d*2 transmits a connection request command to the second wireless audio transmitting device 50*b*, and based on the connection request command, additionally wirelessly connects to the second wireless audio transmitting device 50*b* based on ultra-wideband communication, during wireless connection with the first wireless audio transmitting device 50*a* based on ultra-wideband communication. Accordingly, it is possible to perform frequency hopping in ultra-wideband communication, by using a beacon signal.

Meanwhile, the wireless audio transmitting device 50 illustrated in FIGS. 1A to 1E may be a mobile terminal, a TV, a monitor, a tablet, a home appliance, a vehicle display device, and the like.

Figure 2A:
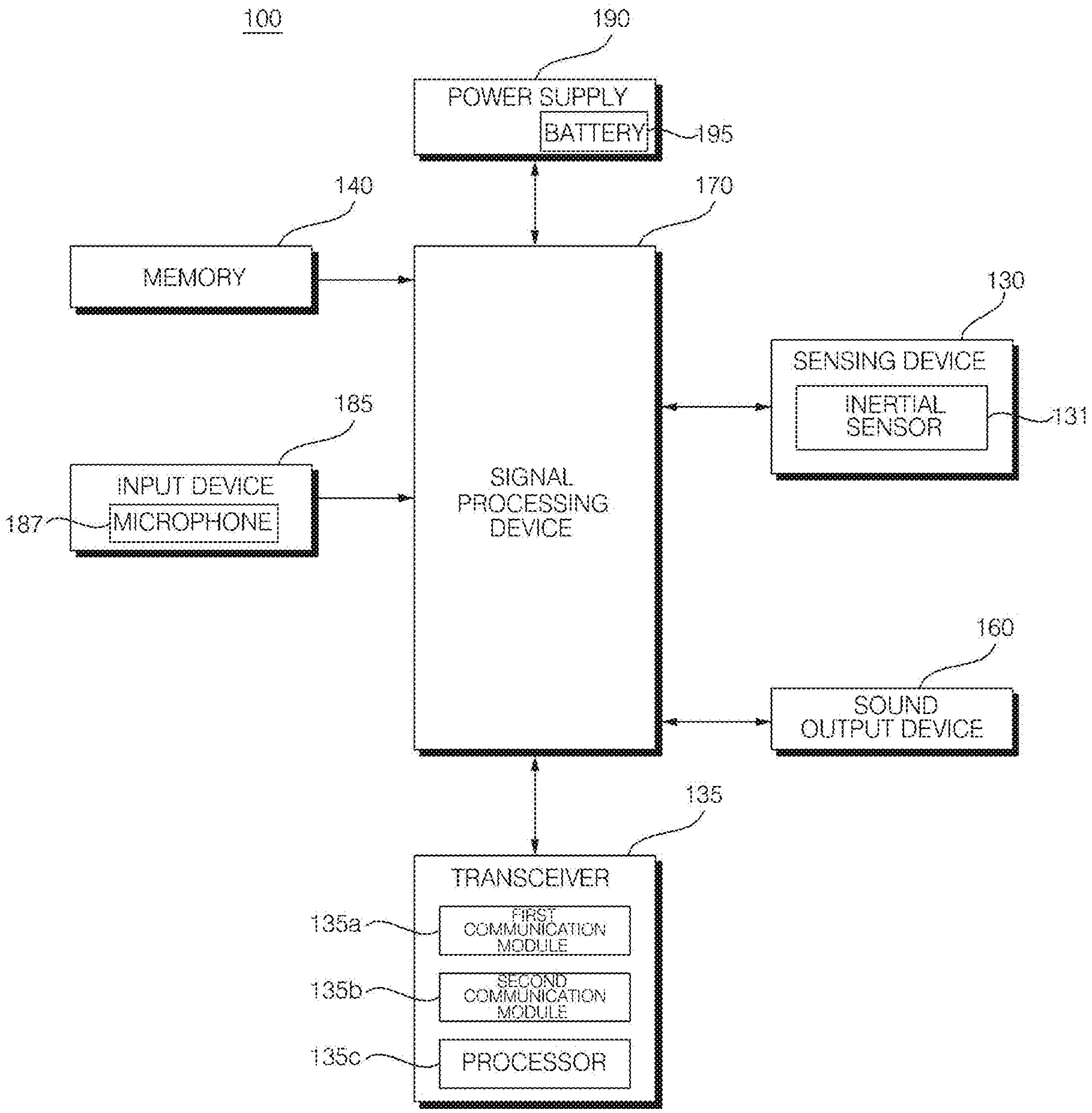
FIG. 2A is an example of an internal block diagram of the wireless audio receiving device of FIGS. 1A to 1E.

FIG. 2A is an example of an internal block diagram of the wireless audio receiving device of FIGS. 1A to 1E.

Referring to FIG. 2A, the wireless audio receiving device 100 may include a sensing device 130, transceiver 135, a memory 140, a sound output device 160, a signal processing device 170, an input device 185, and a power supply 190. When these components are implemented in actual applications, if necessary, two or more components may be combined into one component, or one component may be subdivided into two or more components.

The sensing device 130 may include an inertial sensor 131. The inertial sensor may include an acceleration sensor, a gyro sensor, a gravity sensor, or the like. For example, the acceleration sensor, the gyro sensor, the gravity sensor, or the like may include a 6-axis sensor.

The sensing device 130 may output motion information of the wireless audio receiving device 100, for example, movement information (acceleration information, angular velocity information) or location information based on x, y, z axis.

Meanwhile, the sensing device 130 may include a sensor for obtaining user body information. For example, a blood pressure sensor, a brain wave sensor, or the like may be provided.

Meanwhile, the transceiver 135 may provide an interface for communication with an external device. To this end, the transceiver 135 may include at least one of a mobile communication module (not shown), a wireless Internet module (not shown), a short-distance communication module (not shown), or a GPS module (not shown).

For example, the transceiver 135 may perform IR communication, Bluetooth communication, or WiFi communication, thereby exchanging data with a paired wireless audio transmitting device 50 or transmitting data. In particular, it may receive an audio signal from the paired wireless audio transmitting device 50.

Meanwhile, the transceiver 135 may include a first communication module 135*a* that wirelessly receives a first audio signal according to a first communication standard of a first frequency band, and a second communication module 135*b* that wirelessly receives a second audio signal according to a second communication standard of a second frequency band greater than the first frequency band.

Meanwhile, the transceiver 135 may further include a processor 135*c* for signal processing or control of the first communication module 135*a* and the second communication module 135*b*.

Meanwhile, the first communication module 135*a* receives a first signal data through a first channel CH1, and separately receives a first audio data through a second channel CH2, and the second communication module 135*b* separately receives a second signal data and a second audio data through the same channel CHm.

Accordingly, even though the wireless environment is complicated, it is possible to stably receive audio wirelessly and output sound. In addition, signal data and audio data can be distinguished in the first communication module 135*a* and the second communication module 135*b*, so that t audio can be stably received wirelessly and sound can be output.

Meanwhile, the beacon signal received by the second communication module 135*b* may include unicast information or broadcast information. Accordingly, it is possible to operate by dividing into unicast and broadcast.

Meanwhile, when unicast information is included in the received beacon signal, the second communication module 135*b* may transmit association request information to the wireless audio transmitting device 50 or 100, and may receive association response information from the wireless audio transmitting device 50 or 100. Accordingly, it is possible to operate by dividing into unicast and broadcast.

Meanwhile, the second communication module 135*b* may distinguish whether it is the second signal data or the second audio data, based on identification information in the header among the received second audio signal. Accordingly, signal data and audio data can be distinguished, thereby stably receiving audio wirelessly and outputting sound.

Meanwhile, the second communication module 135*b* may distinguish whether it is the second signal data or the second audio data, based on identification information in a media access control (MAC) header or a physical (PHY) header among the received second audio signal. Accordingly, signal data and audio data can be distinguished, thereby stably receiving audio wirelessly and outputting sound.

Meanwhile, when receiving the second signal data, the second communication module 135*b* may extract encoding or decoding information of the second standard, and based on the extracted encoding or decoding information, may receive the second audio data after the second signal data, and may set a replay time of the second audio data. Accordingly, signal data and audio data can be distinguished, thereby stably receiving audio wirelessly and outputting sound.

The memory 140 may store programs for processing or controlling the signal processing device 170 in the wireless audio receiving device 100, or may perform a function for temporarily storing input or output data.

The sound output device 160 may output an audio signal processed by the signal processing device 170 in the wireless audio receiving device 100.

Alternatively, the sound output device 160 may output guide information related to the operation of the wireless audio receiving device 100 as an audio signal.

Meanwhile, the sound output device 160 may output a first sound corresponding to the first audio signal from the first communication module 135*a* or a second sound corresponding to the second audio signal from the second communication module 135*b*.

The signal processing device 170 may control the overall operation of the wireless audio receiving device 100 by controlling the operation of each unit in the wireless audio receiving device 100.

Meanwhile, the signal processing device 170 may perform signal processing for an audio signal received from the outside.

Meanwhile, the signal processing device 170 may replay an audio signal from the first communication module 135*a* or the second communication module 135*b*.

Meanwhile, the signal processing device 170 may replay the second audio data, based on the decoding information from the second communication module 135*b* and a set replay time. Accordingly, signal data and audio data can be distinguished, thereby stably receiving audio wirelessly and outputting sound.

Meanwhile, the input device 185 may include a button for initializing the wireless audio receiving device 100, or inputting an operation.

Meanwhile, the input device 185 may include a microphone 187 for sound collection.

Meanwhile, the input device 185 may include a camera (not shown) for capturing images.

For example, as shown in FIG. 2A, the input device 185 may include a power key (not shown) for turning power on or off, a FF/REW key (not shown) for going forward or backward in the reproducing audio, a volume key (not shown) for volume up or down, a pause/play key (not shown) for playing or pausing audio, and the like.

The power supply 190 may supply power required for operation of each component under the control of the signal processing device 170.

In particular, the power supply 190 may include a battery 195 that stores and outputs DC power.

Figure 2B:
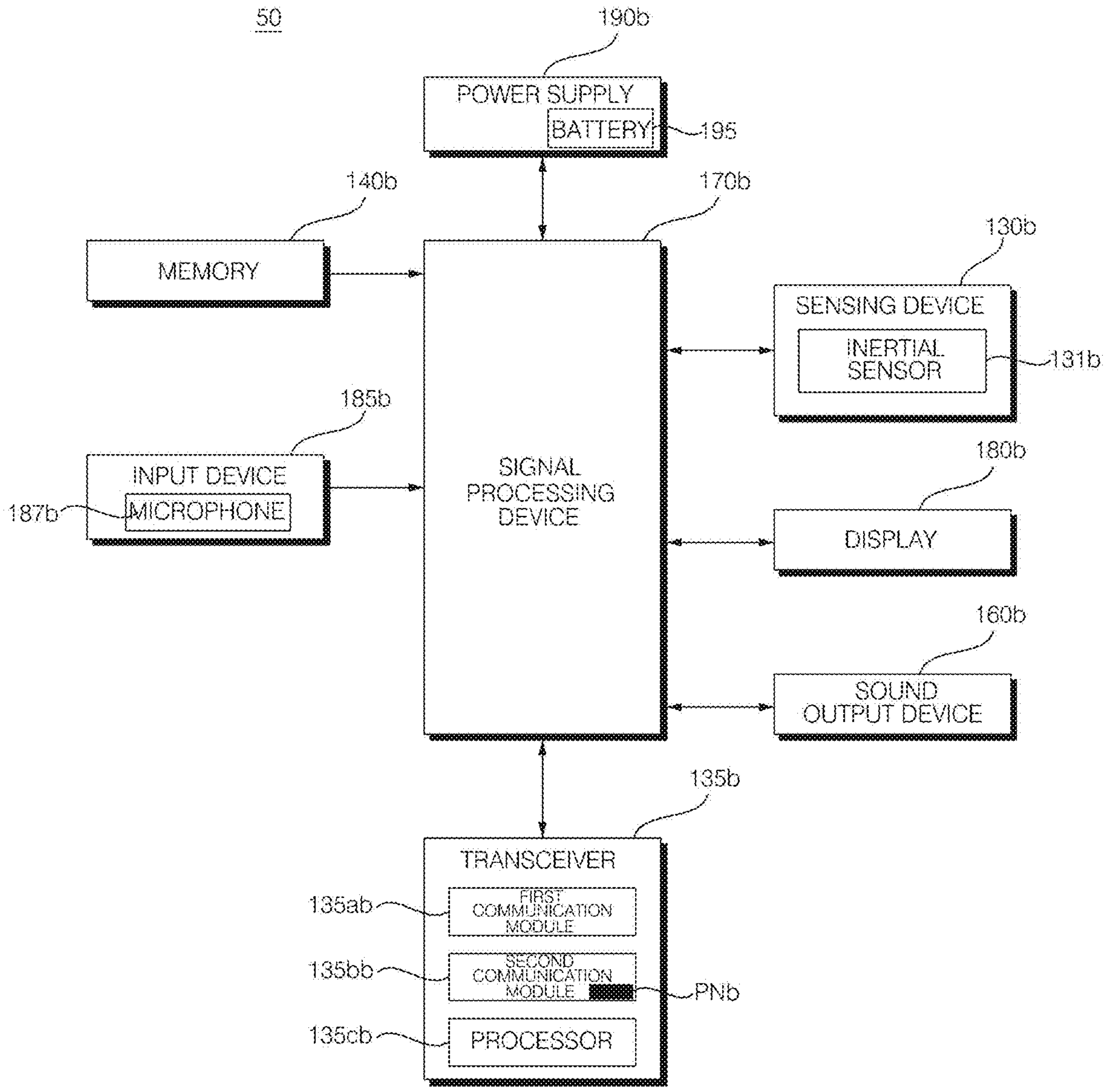
FIG. 2B is an example of an internal block diagram of the wireless audio transmitting device of FIGS. 1A to 1E.

FIG. 2B is an example of an internal block diagram of the wireless audio receiving device of FIGS. 1A to 1E.

Referring to FIG. 2A, the wireless audio transmitting device 50 may include a sensing device 130*b*, a transceiver 135*b*, a memory 140*b*, a sound output device 160*b*, a signal processing device 170*b*, a display 180*b*, an input device 185*b*, and a power supply 190*b*. When these components are implemented in actual applications, if necessary, two or more components may be combined into one component, or one component may be subdivided into two or more components.

The sensing device 130*b* may include an inertial sensor 131*b*. The inertial sensor may include an acceleration sensor, a gyro sensor, a gravity sensor, or the like. For example, the acceleration sensor, the gyro sensor, the gravity sensor, and the like may include a 6-axis sensor.

The sensing device 130*b* may output motion information of the wireless audio transmitting device 50, for example, movement information (acceleration information, angular velocity information) or location information based on x, y, z axis.

Meanwhile, the sensing device 130*b* may include a sensor for obtaining user body information. For example, a blood pressure sensor, a brain wave sensor, or the like may be provided.

Meanwhile, the transceiver 135*b* may provide an interface for communication with an external device. To this end, the transceiver 135*b* may include at least one of a mobile communication module (not shown), a wireless Internet module (not shown), a short-distance communication module (not shown), or a GPS module (not shown).

For example, the transceiver 135*b* may perform IR communication, Bluetooth communication, or WiFi communication, thereby exchanging data with a paired wireless audio receiving device 100 or transmitting data. In particular, it may transmit an audio signal to the paired wireless audio receiving device 100.

Meanwhile, the transceiver 135*b* may include a first communication module 135*ab* for wirelessly transmitting a first audio signal according to a first communication standard of a first frequency band, and a second communication module 135*bb* for wirelessly transmitting a second audio signal according to a second communication standard of a second frequency band (e.g. ultra-wideband) greater than the first frequency band.

Meanwhile, the second communication module 135*bb* may include a personal area network (PAN) coordinator PNb for ultra-wideband communication.

Meanwhile, the transceiver 135*b* may further include a processor 135*cb* for signal processing or control of the first communication module 135*ab* and the second communication module 135*bb*.

Meanwhile, the first communication module 135*ab* transmits a first signal data through a first channel CH1*b*, and separately transmits a first audio data through a second channel CH2, and the second communication module 135*bb* separately transmits a second signal data and a second audio data through the same channel CHm.

Accordingly, even though the wireless environment is complicated, it is possible to stably transmit an audio signal wirelessly. In addition, signal data and audio data can be distinguished in the first communication module 135*ab* and the second communication module 135*bb*, so that audio signals can be stably transmitted wirelessly.

Meanwhile, the beacon signal transmitted from the second communication module 135*bb* may include unicast information or broadcast information. Accordingly, it is possible to operate by dividing into unicast and broadcast.

Meanwhile, when unicast information is included in the transmitted beacon signal, the second communication module 135*bb* may receive association request information from the wireless audio receiving device 100, and transmit association response information to the wireless audio receiving device 100. Accordingly, it is possible to operate by dividing into unicast and broadcast.

Meanwhile, the second communication module 135*bb* may distinguish whether it is a second signal data or a second audio data, based on identification information in a header among the transmitted second audio signal. Accordingly, signal data and audio data can be distinguished, thereby stably transmitting an audio signal wirelessly.

Meanwhile, the second communication module 135*bb* may distinguish whether it is a second signal data or a second audio data, based on identification information in a media access control (MACb) header or a physical (PHYb) header among the transmitted second audio signal. Accordingly, signal data and audio data can be distinguished, thereby stably transmitting an audio signal wirelessly.

The memory 140*b* may store a program for processing or controlling the signal processing device 170*b* in the wireless audio transmitting device 50, or may perform a function for temporarily storing input or output data.

The sound output device 160*b* may output an audio signal processed by the signal processing device 170*b* in the wireless audio transmitting device 50.

Alternatively, the sound output device 160*b* may output guide information related to the operation of the wireless audio transmitting device 50 as an audio signal.

The signal processing device 170*b* may control the overall operation of the wireless audio transmitting device 50 by controlling the operation of each unit in the wireless audio transmitting device 50.

Meanwhile, the signal processing device 170*b* may perform signal processing for an audio signal received from the outside.

Meanwhile, the signal processing device 170*b* may control the operation of each unit, based on data from the first communication module 135*ab* or the second communication module 135*bb*.

The display 180*b* may include LCD, OLED, LED, micro LED, or the like.

Meanwhile, the input device 185*b* may include a button or the like for initializing or inputting an operation of the wireless audio transmitting device 50.

Meanwhile, the input device 185*b* may include a microphone 187*b* for sound collection.

Meanwhile, the input device 185*b* may include a camera (not shown) for capturing images.

For example, as shown in FIG. 2B, the input device 185*b* may include a power key (185*ab*) for turning power on or off, a FF/REW key (185*bb*) for going forward or backward in the reproducing audio, a volume key (185*cb*) for volume up or down, a pause/play key (185*db*) for playing or pausing audio, and the like.

The power supply 190*b* may supply power required for operation of each component under the control of the signal processing device 170*b*.

In particular, the power supply 190*b* may include a battery 195*b* that stores and outputs DC power.

FIGS. 3A to 8B are diagrams for explaining an operation of a wireless audio receiving device or a wireless audio transmitting device according to an embodiment of the present disclosure.

Figure 3A:
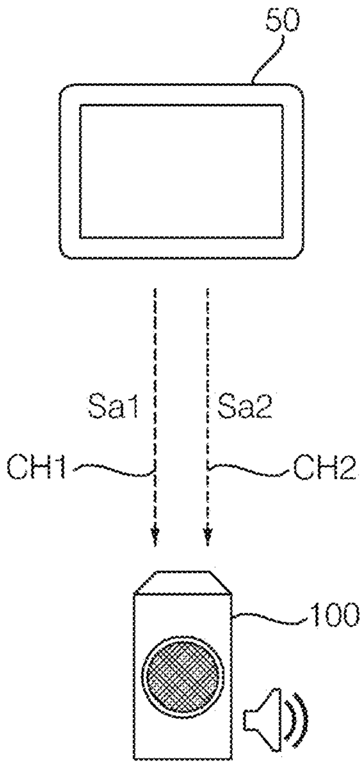
FIGS. 3A to 8B are diagrams for explaining an operation of a wireless audio receiving device or a wireless audio transmitting device according to an embodiment of the present disclosure.

FIG. 3A illustrates that the wireless audio transmitting device 50 outputs a first signal data Sa1 and a first audio data Sa2 to the wireless audio receiving device 100.

Referring to FIG. 3A, the wireless audio transmitting device 50 wirelessly outputs the first signal data Sa1 and the first audio data Sa2 according to a first communication standard of a first frequency band.

In particular, the wireless audio transmitting device 50 may transmit the first signal data Sa1 through the first channel CH1, and separately transmit the first audio data Sa2 through the second channel CH2.

Accordingly, the first communication module 135*a* in the wireless audio receiving device 100 according to an embodiment of the present disclosure receives the first signal data Sa1 through the first channel CH1, and distinguishes and receives the first audio data Sa2 through the second channel CH2.

Figure 3B:
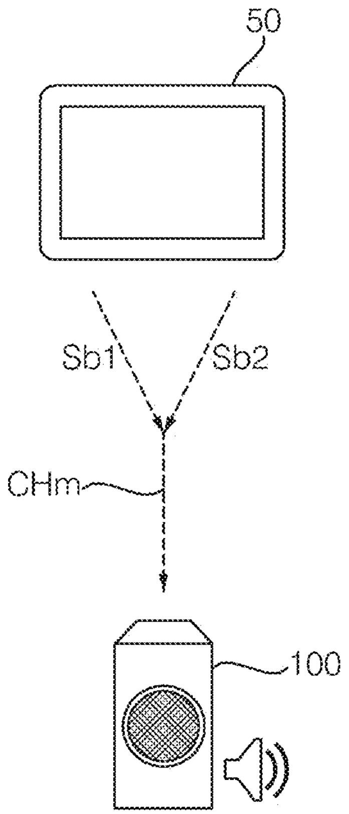

FIG. 3B illustrates that the wireless transmitting device 50 outputs the second signal data Sb1 and the second audio data Sb2 to the wireless audio receiving device 100.

Referring to FIG. 3B, the wireless audio transmitting device 50 wirelessly outputs the second signal data Sb1 and the second audio data Sb2 according to a second communication standard of a second frequency band greater than the first frequency band.

In particular, the wireless audio transmitting device 50 may separately transmit the second signal data Sb1 and the second audio data Sb2 through the same channel CHm.

Accordingly, the second communication module 135*b* in the wireless audio receiving device 100 according to an embodiment of the present disclosure separately receives the second signal data Sb1 and the second audio data Sb2 through the same channel CHm.

Meanwhile, the first communication standard may be a Bluetooth communication standard, and the second communication standard may be an ultra-wideband (UWB) communication standard.

For example, the wireless audio transmitting device 50 may wirelessly transmit an audio signal according to the first communication standard, and then wirelessly transmit the audio signal according to the second communication standard when the wireless environment is complicated.

Accordingly, the wireless audio receiving device 100 may stably receive audio wirelessly and output sound even though the wireless environment is complicated. In addition, signal data and audio data can be distinguished in the first communication module 135*a* and the second communication module 135*b*, so that audio can be stably received wirelessly and sound can be output.

Meanwhile, the first communication module 135*a* according to an embodiment of the present disclosure may transmit the first signal data Sa1 through the first channel CH1, and separately transmit the first audio data Sa2 through the second channel CH2, and the second communication module 135*b* may separately transmit the second signal data Sb1 and the second audio data Sb2 through the same channel CHm. Accordingly, it is possible to stably transmit audio wirelessly even in a complicated wireless environment. In addition, signal data and audio data may be transmitted separately.

Meanwhile, the beacon signal transmitted from the second communication module 135*b* in the wireless audio transmitting device 50 may include unicast information or broadcast information. Accordingly, it is possible to operate by dividing into unicast and broadcast.

Meanwhile, when unicast information is included in the transmitted beacon signal, the second communication module 135*b* in the wireless audio transmitting device 50 may receive association request information from the wireless audio receiving device 100, and transmit association response information from an electronic device to the wireless audio receiving device 100. Accordingly, it is possible to operate by dividing into unicast and broadcast. In addition, it is possible to check whether ultra-wideband (UWB) wireless audio support is possible and transmit audio data wirelessly.

Meanwhile, the second communication module 135*b* in the wireless audio transmitting device 50 may add identification information in a media access control (MAC) header or a physical (PHY) header in order to distinguish whether the transmitted second audio signal is the second signal data Sb1 or the second audio data Sb2. Accordingly, it is possible to operate by dividing into unicast and broadcast.

Meanwhile, when the first communication module 135*a* in the wireless audio transmitting device 50 transmits the first audio signal and then the second communication module 135*b* transmits the second audio signal, Host Control Interface (HCI) data of the first communication standard may be mapped to MAC Layer Management Entity (MLME) interface of the second communication standard, and Asynchronous Connection-Less (ACL) data and audio data of the first communication standard may be mapped to a MAC Common Part Sublayer (MCPS) interface of the second communication standard. Accordingly, signal data and audio data can be distinguished, thereby stably transmitting audio wirelessly.

Meanwhile, when the first communication module 135*a* in the wireless audio transmitting device 50 transmits the first audio signal and then the second communication module 135*b* transmits the second audio signal, an adaptation layer (AL) may be used to map data of the first communication standard to data of the second communication standard. Accordingly, signal data and audio data can be distinguished, thereby stably transmitting audio wirelessly.

Meanwhile, when the second communication module 135*b* n the wireless audio transmitting device 50 transmits the second audio signal, it may transmit the second signal data Sb1 in a contention access period (CAP) of the beacon interval PRa, and may transmit the second audio data Sb2 in a contention free period (CFP) of the beacon interval PRa. Accordingly, signal data and audio data can be distinguished, thereby stably transmitting audio wirelessly.

Meanwhile, the first communication module 135*a* in the wireless audio transmitting device 50 may transmit the first signal data Sa1 and transmit identification information in the first signal data Sa1 to the second communication module 135*b*, and the second communication module 135*b* may separately transmit the second signal data Sb1 in the second audio signal, based on the identification information from the first communication module 135*a*. Accordingly, signal data and audio data can be distinguished, thereby stably transmitting audio wirelessly.

Meanwhile, the first communication module 135*a* in the wireless audio transmitting device 50 may transmit the first audio data Sa2 and transmit identification information in the first audio data Sa2 to the second communication module 135*b*, and the second communication module 135*b* may separately transmit the second audio data Sb2 in second the audio signal, based on the identification information from the first communication module 135*a*. Accordingly, signal data and audio data can be distinguished, thereby stably transmitting audio wirelessly.

Meanwhile, the second communication module 135*b* in the wireless audio transmitting device 50 may receive a security activation value from the wireless audio receiving device 100, and if it matches, generate a key, and encrypt and transmit the second audio data Sb2 by using the generated key. Accordingly, it is possible to stably transmit audio wirelessly based on security.

Figure 3C:
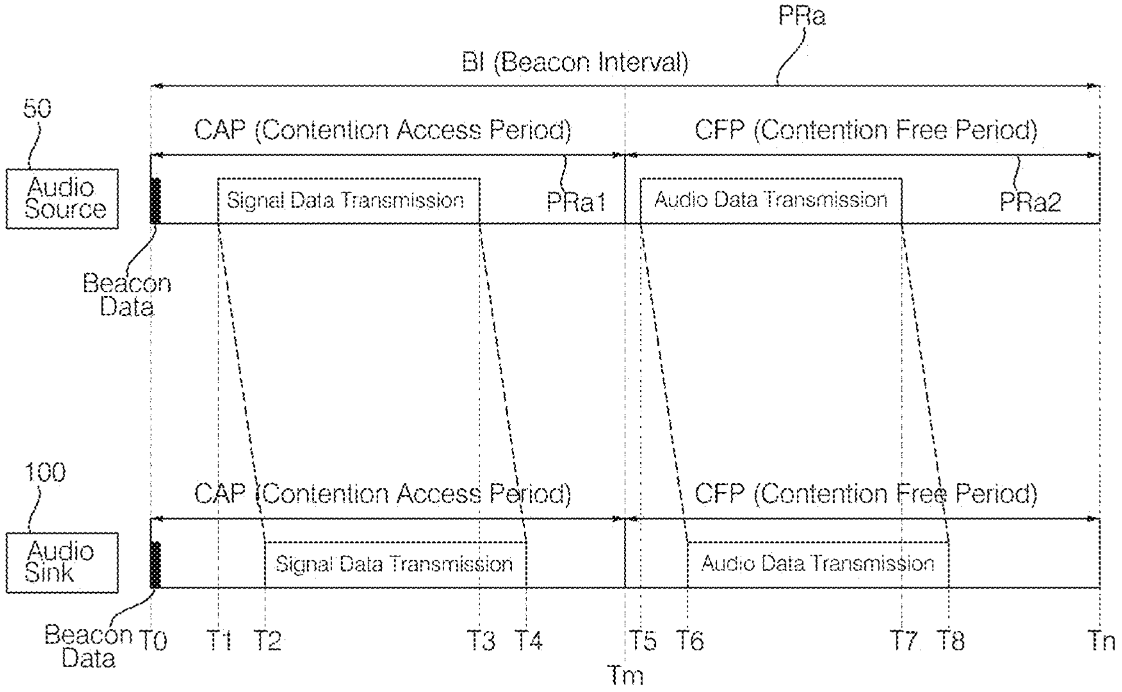

FIG. 3C is a diagram for explaining the operation of the wireless audio transmitting device 50 and the first communication module 135*a* of the wireless audio receiving device 100.

Referring to FIG. 3, the wireless audio transmitting device 50 may wirelessly transmit beacon data at time To during the beacon interval PRa, and the wireless audio receiving device 100 may wirelessly receive the beacon data.

Meanwhile, the wireless audio transmitting device 50 may transmit signal data in a contention access period (CAP) of the beacon interval PRa, and transmit audio data in a contention free period (CFP) of the beacon interval PRa.

In particular, FIG. 3 illustrates that signal data is transmitted between time T1 and time T3 within a contention access period (CAP), and audio data is transmitted between time T5 and time T7 within a contention free period (CFP).

In response, the wireless audio receiving device 100 may receive signal data between time T2 and time T4 within a contention access period (CAP), and may receive audio data between time T6 and time T8 within a contention free period (CFP).

That is, when the second communication module 135*b* in the wireless audio receiving device 100 receives the second audio signal, it may receive the second signal data Sb1 in the contention access period (CAP) of the beacon interval PRa, and may receive the second audio data Sb2 in the contention free period (CFP) of the beacon interval PRa. Accordingly, signal data and audio data can be distinguished, thereby stably receiving audio wirelessly and outputting sound.

Figure 4:
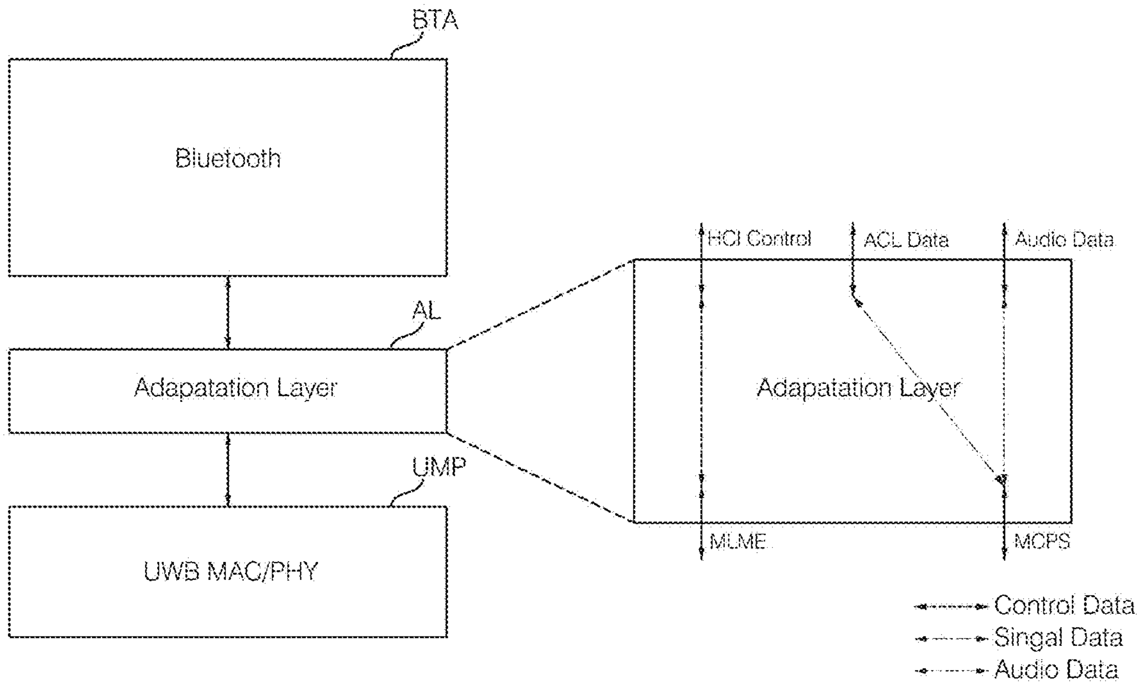

FIG. 4 is a diagram for explaining mapping between a first communication standard and a second communication standard.

Referring to FIG. 4, in order to provide a UWB audio service which is an example of the second communication standard, Bluetooth audio, which is an example of the first communication standard optimized for the audio service, is adopted as an upper protocol.

Bluetooth audio (BTA) interface is composed of HCI Control, ACL Data, and Audio Data.

Meanwhile, the Media access control or physical layer (MAC/PHY) (UMP) of UWB may have a MAC Layer Management Entity (MLME) interface and a MAC Common Part Sublayer (MCPS) interface.

Meanwhile, for mapping between Bluetooth audio (BTA) and UWB media access control or a physical layer (MAC/PHY) (UMP), an adaptation layer (AL) is utilized in an embodiment of the present disclosure.

In the adaptation layer (AL), Host Control Interface (HCI) data of the first communication standard may be mapped to MAC Layer Management Entity (MLME) interface of the second communication standard, and Asynchronous Connection-Less (ACL) data and audio data of the first communication standard may be mapped to a MAC Common Part Sublayer (MCPS) interface of the second communication standard.

Meanwhile, UWB wireless transmission or UWB wireless reception has a frequency band 3.1 GHz to 10.6 GHz different from the unlicensed band 2.4 GHz, thereby avoiding frequency interference with other wireless devices using the unlicensed band, and solving problems such as audio interruption.

In addition, since UWB wireless transmission or UWB wireless reception provides a higher PHY data rate than Bluetooth wireless transmission or wireless reception, high-quality audio service is possible.

Meanwhile, when the first communication module 135*a* receives the first audio signal and then the second communication module 135*b* receives the second audio signal, Host Control Interface (HCI) data of the first communication standard may be mapped to the MAC Layer Management Entity (MLME) interface of the second communication standard, and Asynchronous Connection-Less (ACL) data and audio data of the first communication standard may be mapped to the MAC Common Part Sublayer (MCPS) interface of the second communication standard. Accordingly, signal data and audio data can be distinguished, thereby stably receiving audio wirelessly and outputting sound.

Meanwhile, when the first communication module 135*a* receives the first audio signal and then the second communication module 135*b* receives the second audio signal, data of the first communication standard may be mapped to data of the second communication standard by using an adaptation layer AL. Accordingly, signal data and audio data can be distinguished, thereby stably receiving audio wirelessly and outputting sound.

Figure 5A:
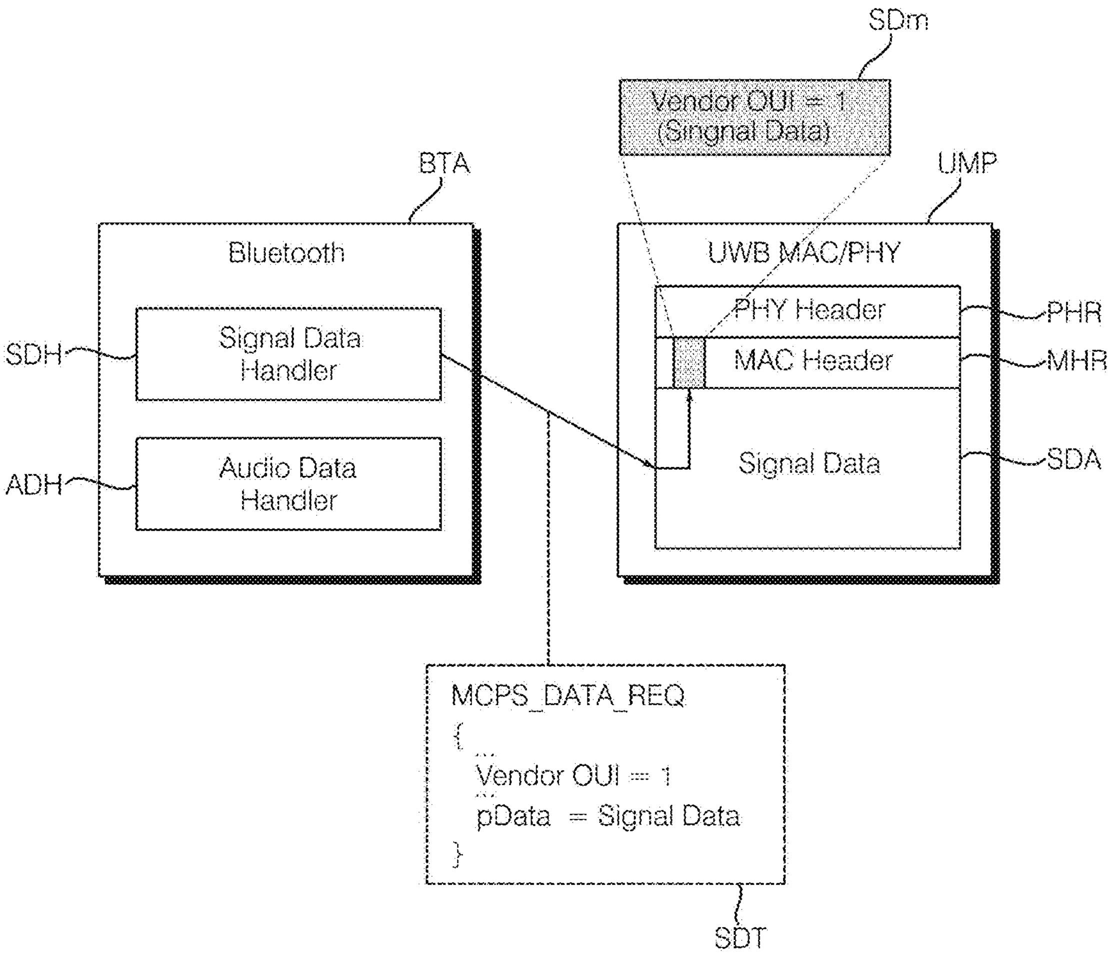
Figure 5B:
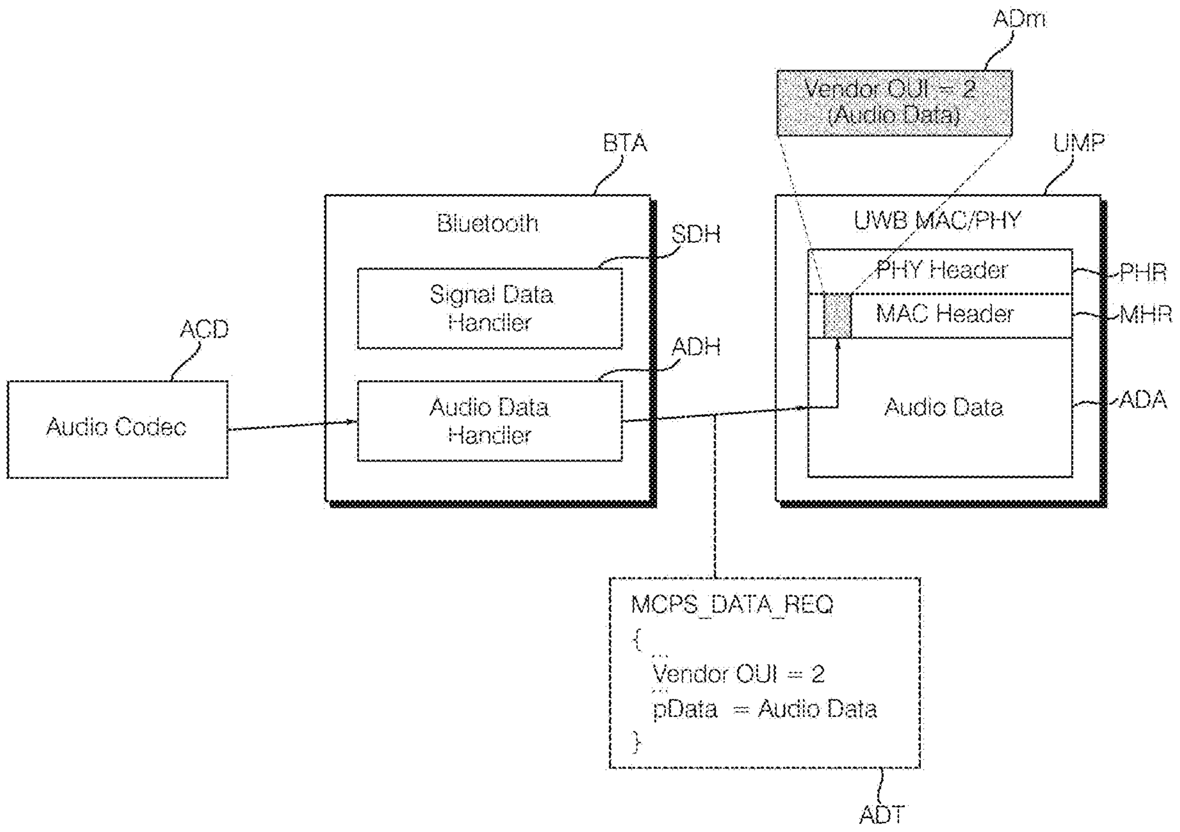

FIGS. 5A and 5B are diagrams for explaining an operation of a wireless audio transmitting device.

Referring to the drawing, the signal data handler SDH in the Bluetooth audio BTA of the wireless audio transmitting device 50 may define an identifier for distinguishing between signal data and audio data by using the Vendor OUI Field of the UWB MAC Header.

FIG. 5A illustrates signal data SDT when the Vendor OUI is '1', and FIG. 5B illustrates audio data ADT when the Vendor OUI is '2'.

In particular, the Bluetooth audio BTA of the wireless audio transmitting device 50 may transmit signal data SDT for codec and QoS configuration used in the UWB audio service.

Meanwhile, when the wireless audio transmitting device 50 transmits the signal data SDT to the Media access control or physical layer (MAC/PHY) (UMP) of UWB, Vendor OUI, which is UWB MAC Header, may be set to '1' and transmitted.

Meanwhile, in the wireless audio receiving device 100, when codec and QoS configuration are completed, audio data may be transmitted from the audio codec to Bluetooth audio BTA, and Bluetooth Audio BTA may be transmitted to the Media access control or physical layer (MAC/PHY) (UMP) of UWB by setting the Vendor OUI, which is UWB MAC Header, to '2'.

In addition, the wireless audio transmitting device 50 may transmit audio data to the wireless audio receiving device 100 with respect to Media access control or physical layer (MAC/PHY) (UMP) of UWB. Accordingly, even though the wireless environment is complicated, it is possible to stably receive audio wirelessly and output sound.

Figure 6A:
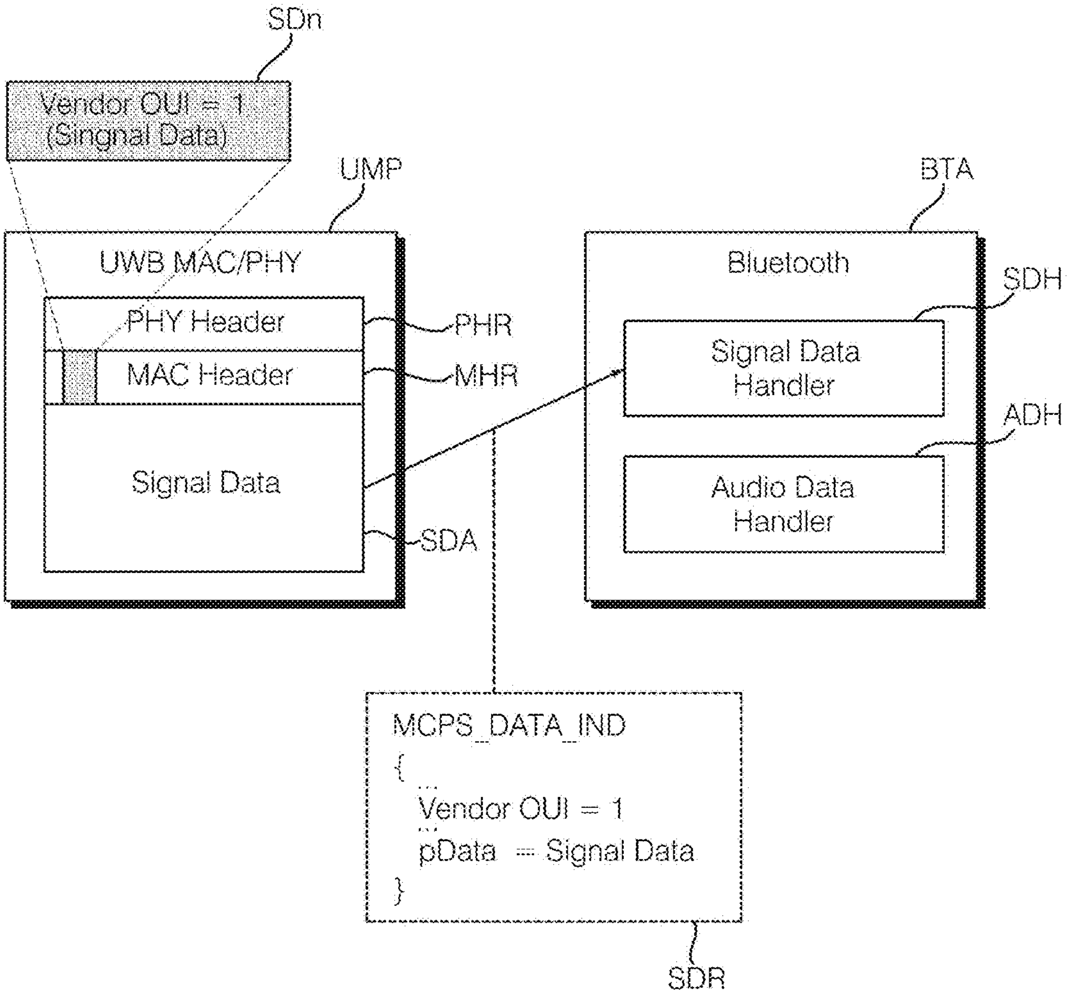
Figure 6B:
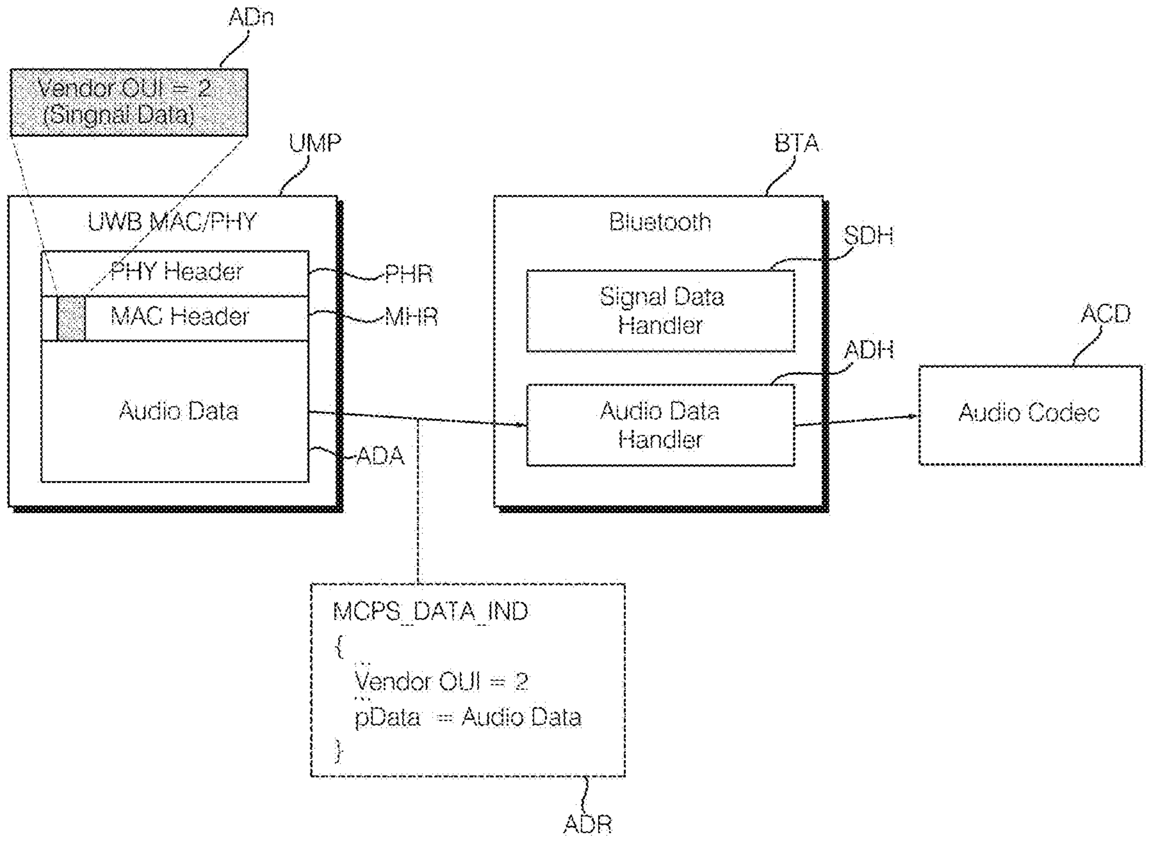

FIGS. 6A and 6B are diagrams for explaining an operation of a wireless audio receiving device.

Referring to the drawing, an identifier for distinguishing between signal data and audio data of Bluetooth audio (BTA) may be defined through the MCPS interface of the wireless audio receiving device 100.

FIG. 6A illustrates signal data SDR when the Vendor OUI is '1', and FIG. 6B illustrates audio data ADR when the Vendor OUI is '2'.

When the Media access control or physical layer (MAC/PHY) (UMP) of UWB of the wireless audio receiving device 100 receives data having Vendor OUI, which is the UWB MAC Header, that is set to '1', Bluetooth audio BTA may move to the signal data handler SDH.

In particular, the Bluetooth audio BTA of the wireless audio receiving device 100 may receive codec and QoS information used in the UWB audio service through a signal data handler SDH, and set information necessary for audio data reception.

Meanwhile, when the codec and QoS configuration for UWB audio service are completed, data whose Vendor OUI, which is the UWB MAC Header, is '2' is received, and Bluetooth audio BTA may move to the audio data handler ADH.

The Bluetooth audio BTA sets a reproducing time for audio data received through an audio data handler (ADH), and the audio data having set reproducing time is transmitted to an audio codec. Accordingly, even though the wireless environment is complicated, it is possible to stably receive audio wirelessly and output sound.

Figure 7:
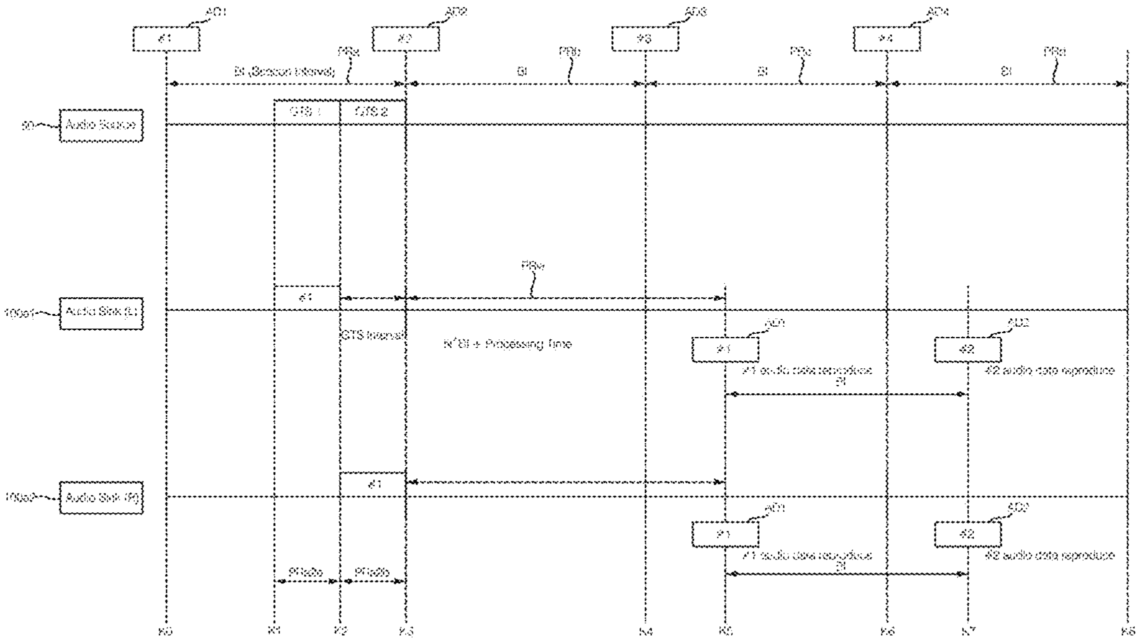

FIG. 7 is a diagram for explaining an UWB audio reproducing time synchronization.

Referring to FIG. 7, the wireless audio transmitting device 50 may sequentially transmit first to fourth audio data AD1 to AD4 to a plurality of wireless audio receiving devices 100*a*1 and 100*a*2 respectively.

In particular, the wireless audio transmitting device 50 may sequentially transmit the first to fourth audio data AD1 to AD4 for each channel in a beacon interval.

FIG. 7 illustrates that a first audio data AD1 is generated at time K0, transmitted to a first wireless audio receiving device 100*a*1 in an interval PRa2*a* between time K1 and time K2, and transmitted to a second wireless audio receiving device 100*a*2 in an interval PRa2*b* between time K2 and time K3.

Meanwhile, the interval PRa2*a* and the interval PRa2*b* may be set respectively by a plurality of wireless audio receiving devices 100*a*1 and 100*a*2 that receive audio data.

Similarly, at time K3, a second audio data AD2 is generated, and transmitted to the first wireless audio receiving device 100*a*1 and the second wireless audio receiving device 100*a*2, within a second beacon interval PRb.

Similarly, at time K4, a third audio data AD3 is generated, and transmitted to the first wireless audio receiving device 100*a*1 and the second wireless audio receiving device 100*a*2, within a third beacon interval PRc.

Similarly, at time K6, a fourth audio data AD4 is generated, and transmitted to the first wireless audio receiving device 100*a*1 and the second wireless audio receiving device 100*a*2, within a fourth beacon interval PRd.

Meanwhile, in order to synchronize and reproduce the first audio data AD1 received in a first beacon interval PRa in the plurality of wireless audio receiving devices 100*a*1 and 100*a*2, it is preferable that it is not reproduced in a second beacon interval PRb, but reproduced at the time K5 in the third beacon interval PRc.

That is, after audio data is reproduced, it is preferable that it is reproduced not in the next beacon interval but in the beacon interval after next.

Meanwhile, it is preferable that the interval PRw from the audio data reception completion time K3 to the reproducing start point K5 is greater than the length of the beacon interval. Accordingly, it is possible to stably synchronize and reproduce audio data.

Meanwhile, after the first audio data AD1 is reproduced at the time K5, it is preferable that the second audio data AD2 is spaced apart by the beacon interval and reproduced at the time K7. Accordingly, it is possible to stably synchronize and reproduce audio data.

Figure 8A:
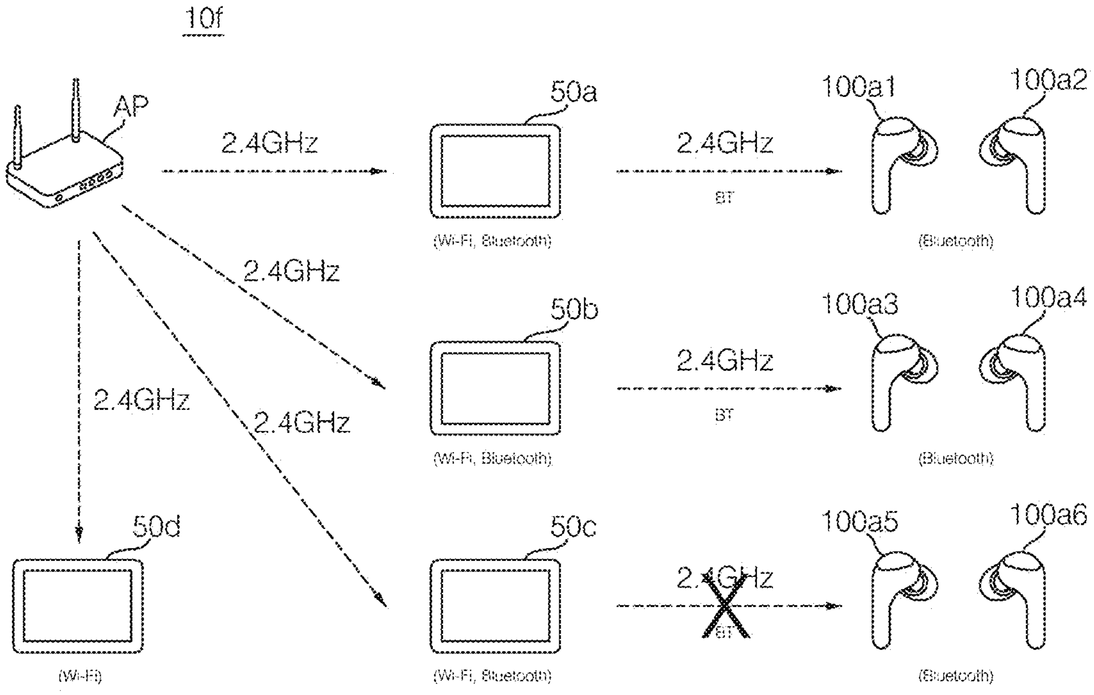
Figure 8B:
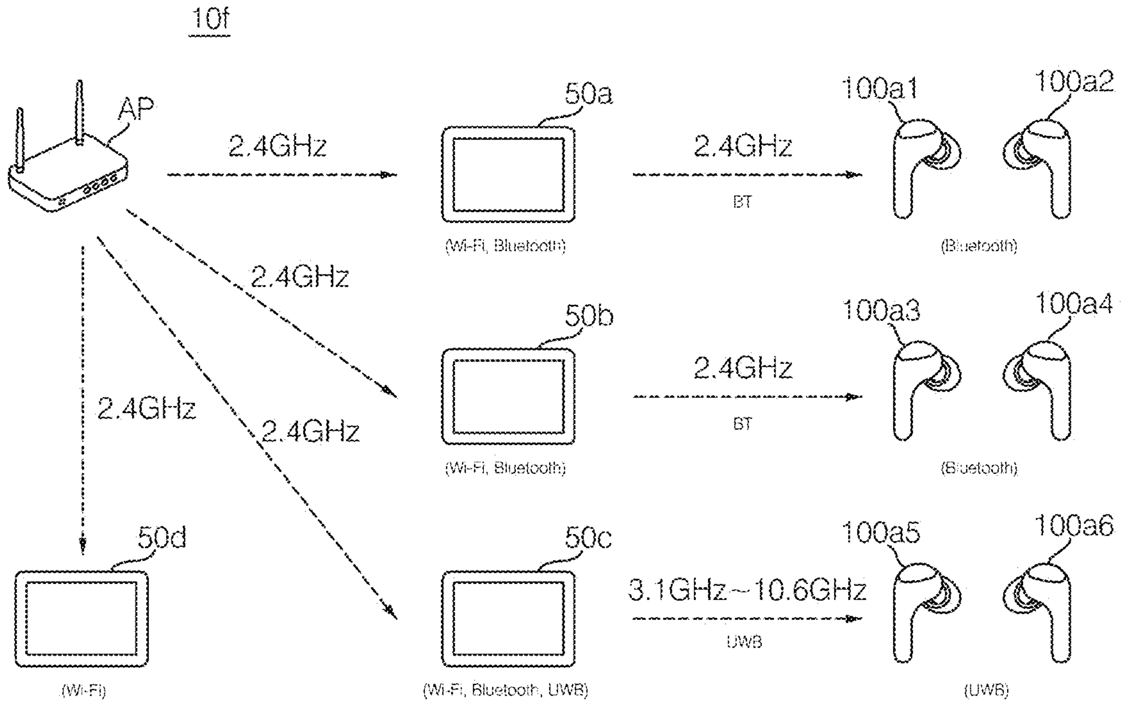

FIGS. 8A and 8B illustrate a wireless audio system 10*f* including an AP device (AP), a plurality of wireless audio transmitting devices 50*a* to 50*d*, and a plurality of wireless audio receiving devices 100*a*1 to 100*a*6.

As shown in FIG. 8A, in a complicated wireless environment, between the plurality of wireless audio transmitting devices 50*a* to 50*d* and the plurality of wireless audio receiving devices 100*a*1 to 100*a*6, when audio is transmitted wirelessly by using Bluetooth communication which is the same first communication standard, audio data transmission becomes impossible due to frequency interference.

FIG. 8A illustrates that audio data transmission is impossible due to frequency interference, between a third wireless audio transmitting device 50*c* and the plurality of wireless audio receiving devices 100*a*5 to 100*a*6.

In order to solve this problem, an embodiment of the present disclosure utilizes a second communication standard having a larger frequency band and a larger bandwidth than the first communication standard. The second communication standard may be UWB.

As shown in FIG. 8B, in a complicated wireless environment, it is preferable that among a plurality of wireless audio transmitting devices 50*a* to 50*d* and a plurality of wireless audio receiving devices 100*a*1 to 100*a*6, devices excluding the third wireless audio transmitting device 50*c* and the plurality of wireless audio receiving devices 100*a*5 to 100*a*6 use Bluetooth communication which is the first communication standard, and the third wireless audio transmitting device 50*c* and the plurality of wireless audio receiving devices 100*a*5 to 100*a*6 use UWB communication. Accordingly, it is possible to stably transmit and receive wireless audio data even in a complicated wireless environment.

Meanwhile, since ultra-wideband UWB communication has characteristics of low frequency congestion and resistance to interference, it may be suitable in a complicated wireless environment.

Accordingly, UWB communication is used to detect indoor positioning, but in the present disclosure, it is assumed to be used for audio service.

Meanwhile, UWB communication may be provided in standard specifications such as IEEE 802.15.4.

Figure 9A:
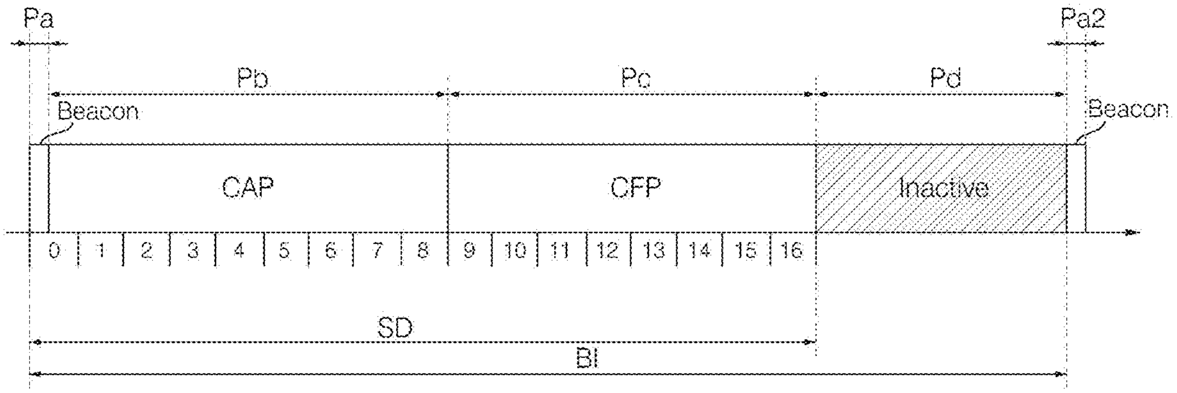
FIG. 9A is a diagram illustrating a beacon interval in ultra-wideband communication.

FIG. 9A is a diagram illustrating a beacon interval in ultra-wideband communication.

As shown in FIG. 9A, according to the IEEE 802.15.4 standard for ultra-wideband (UWB) communication, the beacon interval BI includes a first period Pa configured to transmit a beacon signal (Beacon), a second period Pb corresponding to a contention access period CAP, a third period Pc corresponding to a contention free period CFP, and an inactive period Pd.

Meanwhile, an active period includes a first period Pa, a second period Pb, and a third period Pc, and the active period may be referred to as a superframe duration SD.

Meanwhile, after the end of the beacon interval BI, the first period Pa2 configured to transmit the beacon signal (Beacon) is disposed again in an additional beacon interval BI.

The wireless audio transmitting device 50 may transmit audio data to the wireless audio receiving device 100, by using the beacon interval BI of FIG. 9A through ultra-wideband communication.

Meanwhile, the wireless audio receiving device 100 may receive audio data from the wireless audio receiving device 100, by using the beacon interval BI of FIG. 9A through ultra-wideband communication.

Meanwhile, in the inactive period rather than the active period, the wireless audio transmitting device 50 and the wireless audio receiving device 100 operate with a low power.

Figure 9B:
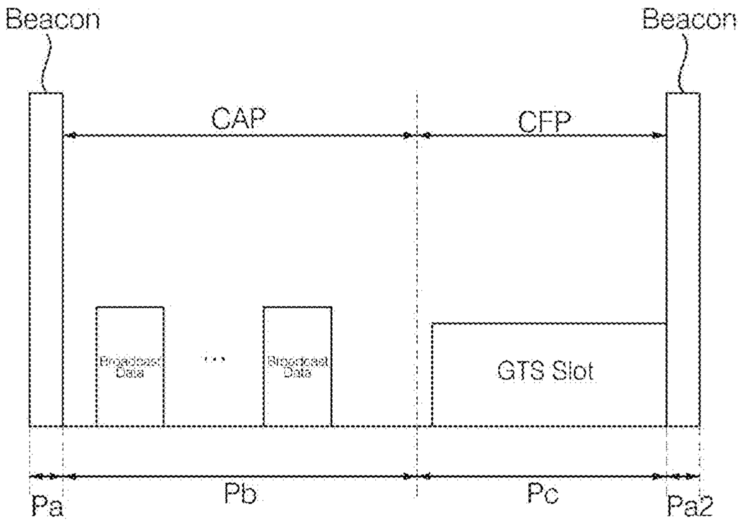
FIG. 9B is a diagram for explaining FIG. 9A.

FIG. 9B is a diagram for explaining FIG. 9A.

Referring to the drawing, FIG. 9B is similar to FIG. 9A, but shows only an active period in the beacon interval BI.

The beacon interval BI includes a first period Pa configured to transmit a beacon signal (Beacon), a second period Pb corresponding to a contention access period CAP, and a third period Pc corresponding to a contention free period CFP.

Meanwhile, the second period Pb corresponds to a period configured to transmit broadcast data.

Meanwhile, the third period Pc is a period for unicast data transmission, and includes a guaranteed time slot.

According to communication standards, in order for the wireless audio transmitting device 50 to transmit unicast audio data in a unicast method, the wireless audio receiving device 100 must be connected to the wireless audio transmitting device 50.

Meanwhile, in order for the wireless audio transmitting device 50 to transmit unicast audio data in a unicast method, PAN a coordinator PNb in the transceiver 135*b* inside the wireless audio transmitting device 50 assigns a guaranteed time slot GTS, and transmits information related to the assigned guaranteed time slot GTS to the wireless audio receiving device 100.

In response to this, the wireless audio receiving device 100 receives unicast audio data through the guaranteed time slot GTS in the third period Pc, based on the information related to the assigned guaranteed time slot GTS.

Meanwhile, according to communication standards, in order for the wireless audio transmitting device 50 to transmit broadcast audio data, a plurality of wireless audio receiving devices 100 must be connected to the wireless audio transmitting device 50.

Meanwhile, in order to transmit broadcast audio data to a plurality of wireless audio receiving devices, the PAN coordinator PNb in the transceiver 135*b* inside the wireless audio transmitting device 50 checks an empty period during a contention access period in the second period Pb, and assigns and transmits broadcast audio data, in the empty period.

Alternatively, in order to transmit broadcast audio data to a plurality of wireless audio receiving devices, the transceiver 135*b* inside the wireless audio transmitting device 50 may transmit broadcast audio data to at least one unconnected wireless audio receiving device 100, by using a guaranteed time slot within the contention free period, in a beacon interval BI including the contention free period.

Figure 10A:
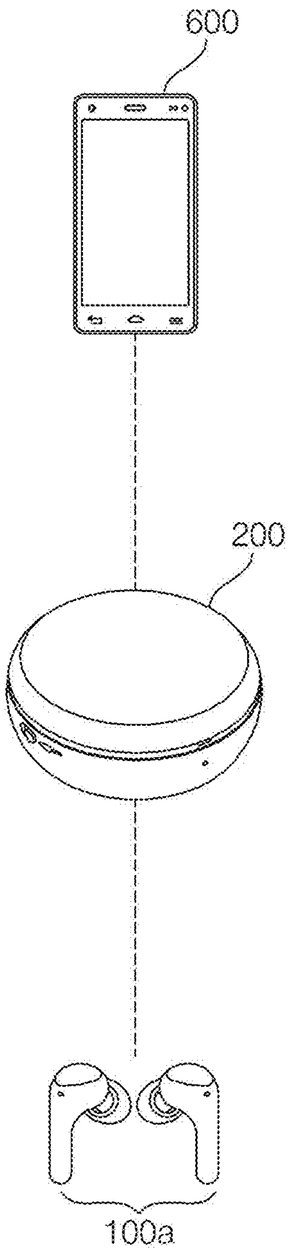
FIG. 10A is a diagram illustrating an example of an audio exclusive transmission mode in ultra-wideband communication.

FIG. 10A is a diagram illustrating an example of an audio exclusive transmission mode in ultra-wideband communication.

Referring to FIG. 10A, in an audio exclusive transmission mode in ultra-wideband communication, a mobile terminal 600 may transmit unicast audio data to the wireless audio receiving device 100*a*.

At this time, the mobile terminal 600 may transmit the unicast audio data to a cradle device 200 that can charge the wireless audio receiving device 100*a* by placing it therein, and the cradle device 200 may transmit the unicast audio data to the wireless audio receiving device 100*a*.

At this time, ultra-wideband communication may be performed between the cradle device 200 and the wireless audio receiving device 100*a*.

Meanwhile, the mobile terminal 600 and the cradle device 200 may exchange audio data through ultra-wideband communication or other communication method.

Figure 10B:
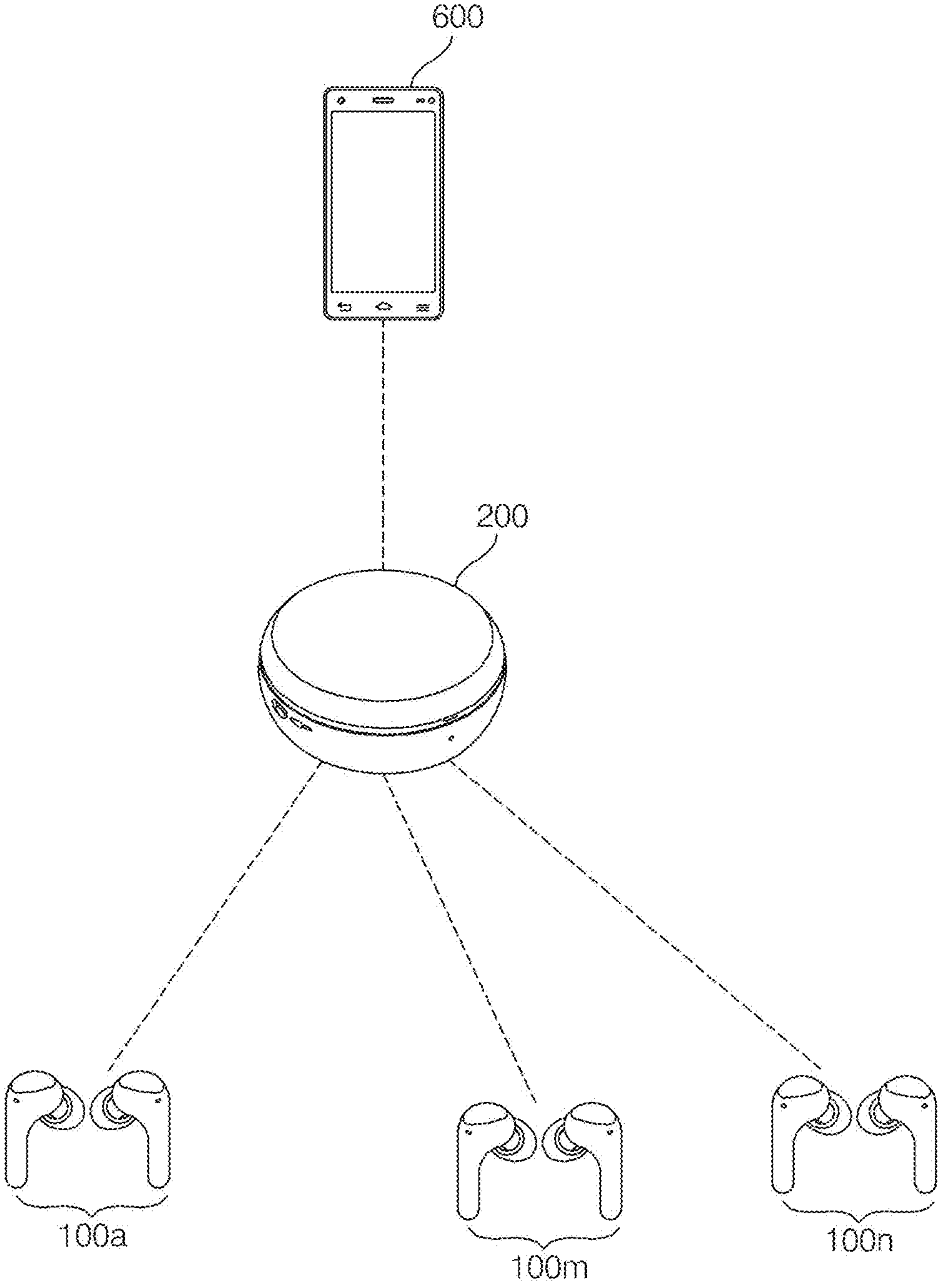
FIG. 10B is a diagram illustrating an example of an audio sharing mode in ultra-wideband communication.

FIG. 10B is a diagram illustrating an example of an audio sharing mode in ultra-wideband communication.

Referring to FIG. 10B, in an audio sharing mode in ultra-wideband communication, the mobile terminal 600 may transmit broadcast audio data to a plurality of wireless audio receiving devices 100*a*, 100*m*, and 100*n*.

At this time, the mobile terminal 600 may transmit audio data to a cradle device 200 that can charge the first wireless audio receiving device 100*a*, among the plurality of wireless audio receiving devices 100*a*, 100*m*, and 100*n*, by placing it therein, and the cradle device 200 may transmit the broadcast audio data to the plurality of wireless audio receiving devices 100*a*, 100*m*, and 100*n*.

At this time, ultra-wideband communication may be performed between the cradle device 200 and the plurality of wireless audio receiving devices 100*a*, 100*m*, and 100*n*.

Meanwhile, the mobile terminal 600 and the cradle device 200 may exchange audio data through ultra-wideband communication or other communication method.

At this time, the audio data transmitted between the mobile terminal 600 and the cradle device 200 may be unicast audio data or broadcast audio data.

For example, when the audio data transmitted between the mobile terminal 600 and the cradle device 200 is unicast audio data, the audio sharing mode may be executed by the cradle device 200, not the mobile terminal 600.

As another example, when the audio data transmitted between the mobile terminal 600 and the cradle device 200 is broadcast audio data, the audio sharing mode may be executed by the cradle device 200 as well as the mobile terminal 600.

Figure 11:
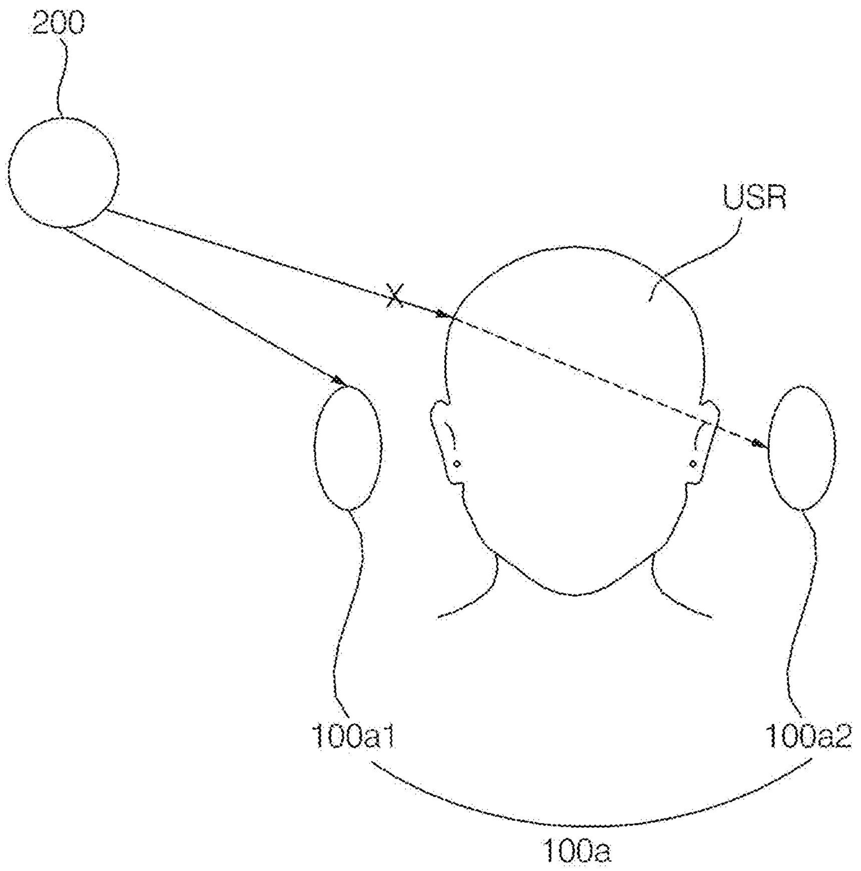
FIG. 11 is a diagram illustrating a head effect of an audio receiving device.

FIG. 11 is a diagram illustrating a head effect of an audio receiving device.

Referring to FIG. 11, the wireless audio receiving device 100*a* may include a first wireless audio receiving device 100*a*1 for receiving an audio signal of a first channel, and a second wireless audio receiving device 100*a*1 for receiving an audio signal of a second channel 100*a*2.

Meanwhile, the wireless audio receiving device 100*a* may be a wireless audio receiving device that can be worn by a user USR.

Accordingly, the first wireless audio receiving device 100*a*1 and the second wireless audio receiving device 100*a*2 can be worn on the user's left and right ears, respectively.

Meanwhile, the audio signal of the first channel may be an audio signal for the left ear, and the audio signal of the second channel may be an audio signal for the right ear.

Meanwhile, in the normal mode, the cradle device 200, which is an example of the second relay mode information INb audio transmitting device 50, may wirelessly transmit the audio signal of the first channel and the audio signal of the second channel.

Meanwhile, when the cradle device 200 is disposed in one side of a user USR, the size of the wireless signal during wireless transmission may be drastically reduced by the head of the user USR. Such a phenomenon of the second relay mode information INb may be called a head effect.

In particular, the signal size of the audio signal of the second channel may be significantly reduced. Accordingly, since the wireless signal reception of the second wireless audio receiving device 100*a*2 is not smooth, there may occurs a problem that a sound corresponding to the audio signal of the second channel is not output.

Accordingly, this disclosure proposes a method for resolving this head effect, and in particular, proposes a method of eliminating head effect by using relay mode not normal mode.

Figure 12:
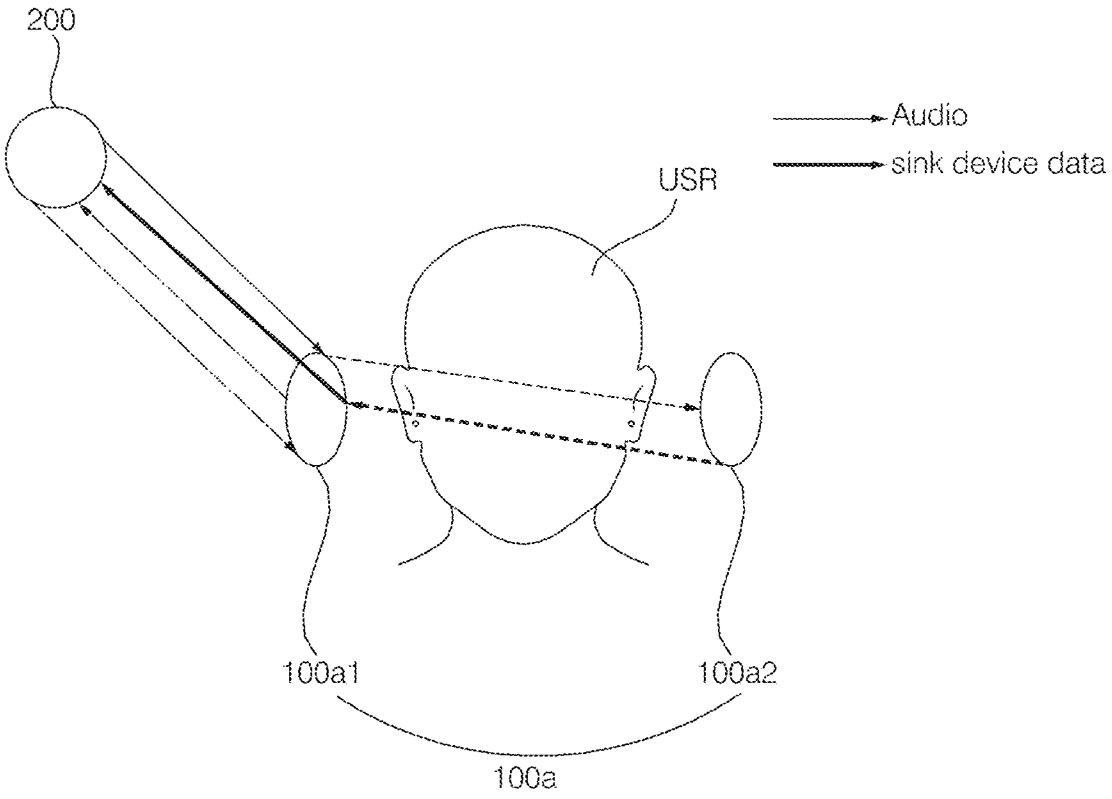
FIG. 12 is a diagram illustrating a relay mode of an audio receiving device.

FIG. 12 is a diagram illustrating the relay mode of the audio receiving device.

Referring to FIG. 12, the cradle device 200, which is an example of the audio transmitting device 50 according to an embodiment of the present disclosure, can wirelessly transmit an audio signal of first channel and an audio signal of second channel.

Meanwhile, the cradle device 200, which is an example of the audio transmitting device 50 according to an embodiment of the present disclosure, receives a confirmation message from the first wireless audio receiving device 100*a*1 and the second wireless audio receiving device 100*a*2, and in case in which a confirmation message is not received within a predetermined time, may switch the normal mode to the relay mode so as to transmit an audio signal to the second wireless audio receiving device 100*a*2.

For example, the cradle device 200, which is an example of the audio transmitting device 50, may further transmit relay mode information indicating the relay mode, in a case of transmitting an audio signal of the second channel.

Meanwhile, the first wireless audio receiving device 100*a*1 according to an embodiment of the present disclosure may transmit a confirmation message to the audio transmitting device 50, when receiving an audio signal of the first channel.

Meanwhile, the first wireless audio receiving device 100*a*1 according to an embodiment of the present disclosure may switch the normal mode to the relay mode, when the audio signal of the second channel and the relay mode information are received.

Accordingly, the first wireless audio receiving device 100*a*1 transmits the received audio signal of second channel or the audio signal processed based on the audio signal of second channel to the second wireless audio receiving device 100*a*2.

Accordingly, the second wireless audio receiving device 100*a*2, unlike the normal mode of FIG. 11, may stably receive an audio signal of the second channel or an audio signal processed based on the audio signal of the second channel, according to the relay mode of FIG. 12.

In particular, in the relay mode, the relay of audio signal may be quickly performed through ultra-wideband communication, without a separate device-to-device connection between the first wireless audio receiving device 100*a*1 and the second wireless audio receiving device 100*a*2.

Eventually, the first wireless audio receiving device 100*a*1 and the second wireless audio receiving device 100*a*2 are able to perform stable wireless audio playback through ultra-wideband communication.

Meanwhile, when receiving an audio signal of second channel or an audio signal of second channel, the second wireless audio receiving device 100*a*2 may transmit data such as a confirmation message to the first wireless audio receiving device 100*a*1, and the first wireless audio receiving device 100*a*1 may transmit data received from the second wireless audio receiving device 100*a*2 to the cradle device 200 which is an example of the audio transmitting device 50.

Accordingly, stable data transmission via the first wireless audio receiving device 100*a*1 is possible.

Figure 13:
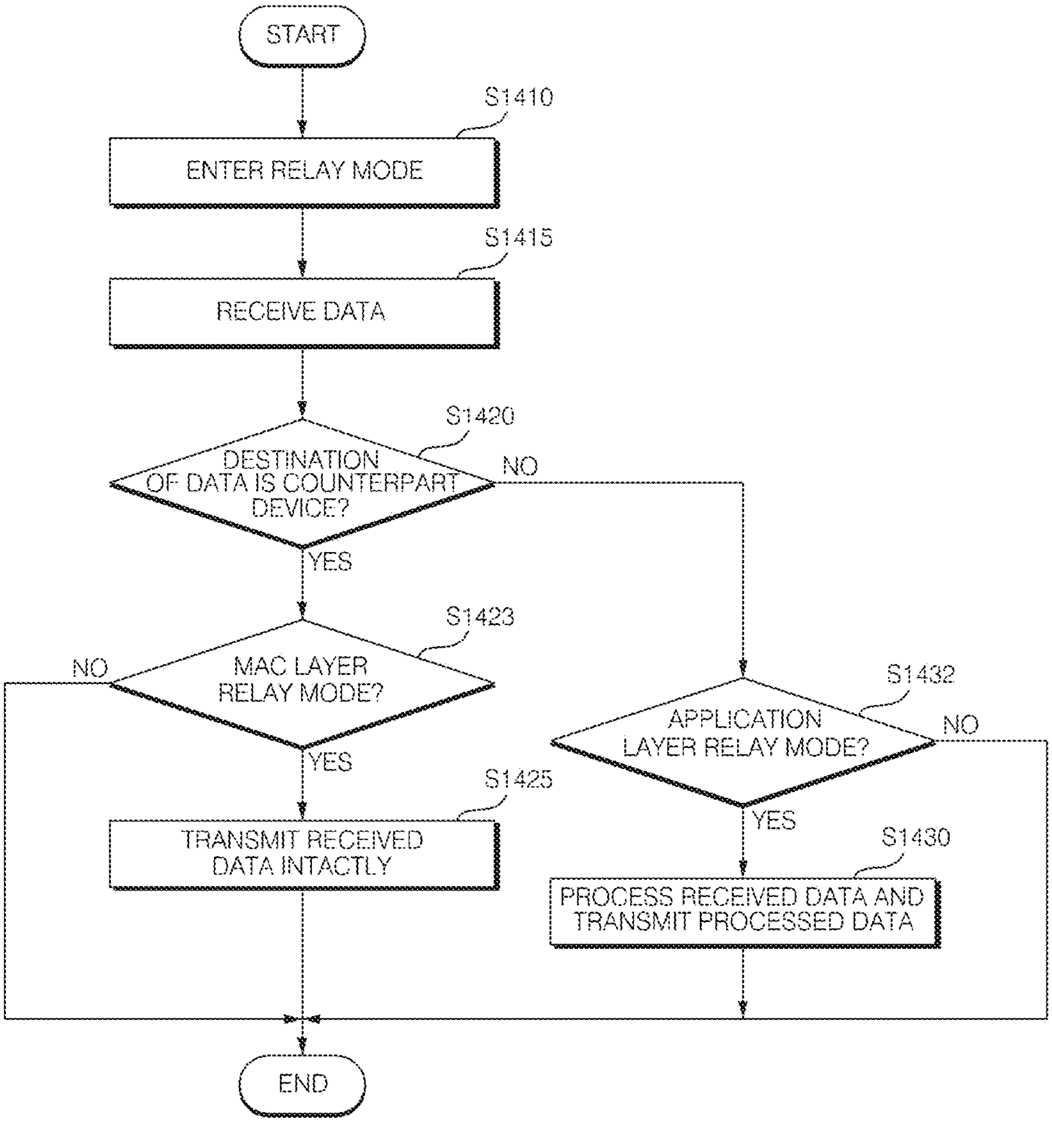
FIG. 13 is a flowchart illustrating a method of operating a wireless audio receiving device according to an embodiment of the present disclosure.

FIG. 13 is a flowchart illustrating a method of operating a wireless audio receiving device according to an embodiment of the present disclosure.

Referring to FIG. 13, in the normal mode, the transceiver 135*b* in the audio transmitting device 50 may transmit the audio signal of the second relay mode information INb first channel and the audio signal of the second channel.

In response to this, the transceiver 135 in the first wireless audio receiving device 100*a*1 may receive the audio signal of the first channel from the audio transmitting device 50.

Meanwhile, the transceiver 135 in the first wireless audio receiving device 100*a*1 may transmit a first confirmation message to the wireless audio transmitting device 50, after receiving the audio signal of the first channel from the audio transmitting device 50.

Meanwhile, the transceiver 135*b* in the audio transmitting device 50 receives the first confirmation message from the first wireless audio receiving device 100*a*1 within a predetermined time, but when the second confirmation message is not received from the second relay mode information INb second wireless audio receiving device 100*a*2 within a predetermined time, may further transmit an audio signal of second channel, or directly enter the relay mode from the normal mode.

Meanwhile, the transceiver 135*b* in the audio transmitting device 50 may transmit relay mode information when entering the relay mode from the normal mode.

Next, the first wireless audio receiving device 100*a*1 among the wireless audio receiving devices 100*a* may enter the relay mode (S1410).

For example, the first wireless audio receiving device 100*a*1 may enter the relay mode, based on relay mode information received from the audio transmitting device 50.

Meanwhile, the transceiver 135 in the first wireless audio receiving device 100*a*1 receives the audio signal of the second channel from the wireless audio transmitting device 50 according to the relay mode (S1415).

Meanwhile, the transceiver 135 in the first wireless audio receiving device 100*a*1 determines whether the destination of the received audio signal of the second channel is the second wireless audio receiving device 100*a*2 which is the counterpart device (S1420), and if applicable, determine whether it is a first relay mode (S1423).

Meanwhile, when in the first relay mode, the transceiver 135 in the first wireless audio receiving device 100*a*1 may transmit the audio signal of the second channel intactly to the second wireless audio receiving device 100*a*2 (S1425).

Accordingly, the second wireless audio receiving device 100*a*2 may stably receive the audio signal of the second channel via the second relay mode information INb first wireless audio receiving device 100*a*1. Therefore, it is possible to relay audio signals through ultra-wideband communication.

Meanwhile, at step 1420 (S1420), the transceiver 135 in the first wireless audio receiving device 100*a*1 determines whether it is in the second relay mode, when the destination of the received audio signal of second channel is the first wireless audio receiving device 100*a*1, rather than the second wireless audio receiving device 100*a*2 which is the counterpart device (S1432).

Meanwhile, in the case of the second relay mode, the transceiver 135 in the first wireless audio receiving device 100*a*1 may transmit the audio signal processed based on the received audio signal of the second channel to the second wireless audio receiving device 100*a*2 (S1430).

Accordingly, it is possible to relay audio signals through ultra-wideband communication. In particular, it is possible to quickly relay audio signals through ultra-wideband communication without a separate connection between devices. Furthermore, stable wireless audio playback can be performed through ultra-wideband communication.

Meanwhile, the first relay mode may be a relay mode based on the media access control layer, and the second relay mode may be a relay mode based on the application layer.

Figure 14:
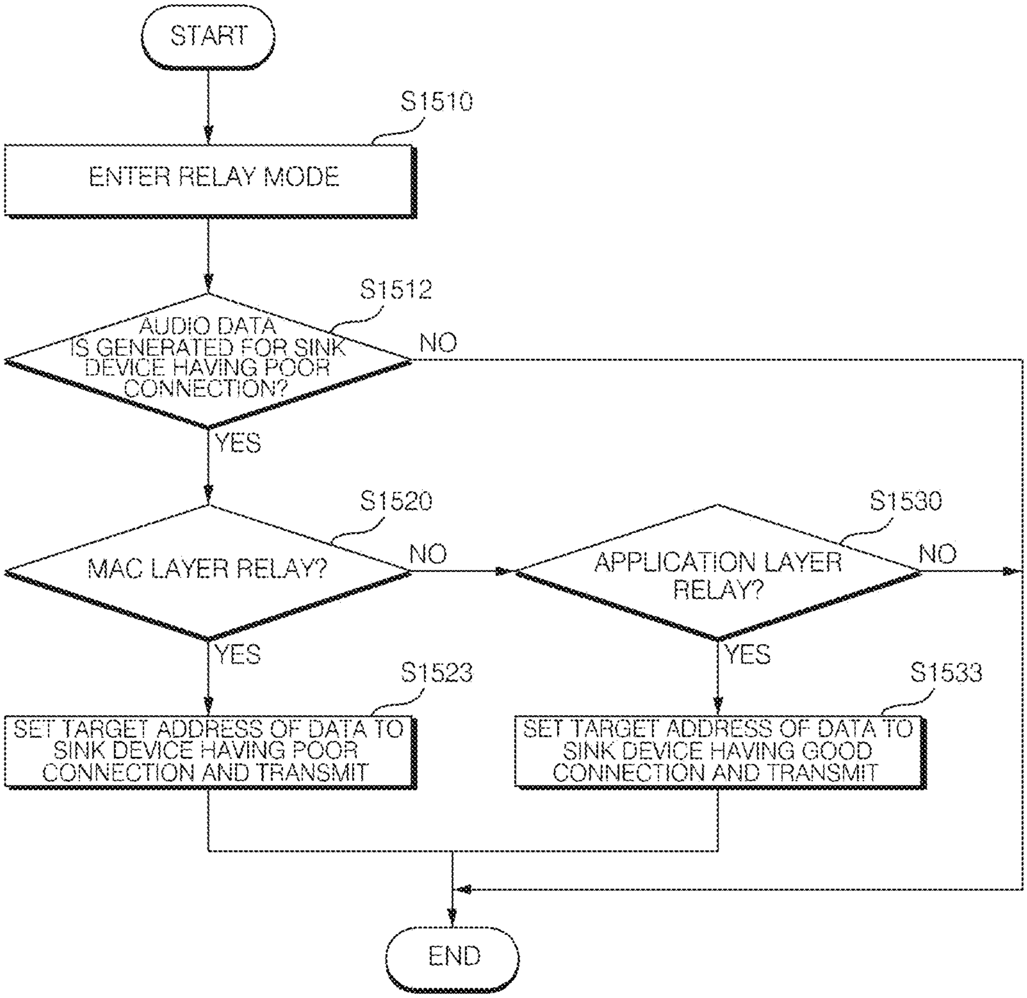
FIG. 14 is a flowchart illustrating a method of operating a wireless audio transmitting device according to an embodiment of the present disclosure.

FIG. 14 is a flowchart illustrating a method of operating a wireless audio transmitting device according to an embodiment of the present disclosure.

Referring to FIG. 14, in the normal mode, the transceiver 135*b* in the audio transmitting device 50 may transmit the audio signal of the second relay mode information INb first channel and the audio signal of the second channel.

Meanwhile, the transceiver 135*b* in the audio transmitting device 50 may additionally transmit an audio signal of the second channel, or may directly enter the relay mode from the normal mode, when the first confirmation message is received within a predetermined time, from the first wireless audio receiving device 100*a*1, but when the second confirmation message is not received within a predetermined time from the second relay mode information INb second wireless audio receiving device 100*a*2 (S1510).

For example, the transceiver 135*b* in the audio transmitting device 50 may transmit relay mode information, when entering the relay mode from the normal mode.

Next, the transceiver 135*b* in the audio transmitting device 50 may determine whether transmission of the audio signal of the second channel is necessary, after entering the relay mode (S1512).

Meanwhile, when transmission of the audio signal of the second channel is necessary, the transceiver 135*b* in the audio transmitting device 50 may determine whether it is in the first relay mode (S1520), and in the case of the first relay mode, set the target address of the audio signal of the second relay mode information INb audio signal of second channel to the second wireless audio receiving device 100*a*2, and transmit the audio signal of second channel including the set target address information (S1523).

In response to this, the transceiver 135 in the first wireless audio receiving device 100*a*1 may receive the second wireless audio receiving device 100*a*2 according to the first relay mode, and transmit the audio signal of the second channel intactly to the second relay mode information INb second wireless audio receiving device 100*a*2.

Meanwhile, at step 1520 (S1520), when it is not the first relay mode, the transceiver 135*b* in the audio transmitting device 50 may determine whether it is the second relay mode (S1530), and in the case of the second relay mode, set the target address of the second relay mode information INb audio signal of second channel to the first wireless audio receiving device 100*a*1, and transmit the audio signal of second channel including the set target address information (S1533).

In response to this, the transceiver 135 in the first wireless audio receiving device 100*a*1 may receive the second wireless audio receiving device 100*a*2 according to the second relay mode, and transmit the audio signal processed based on the received audio signal of second channel to the second relay mode information INb second wireless audio receiving device 100*a*2.

Accordingly, it is possible to relay audio signals through ultra-wideband communication. In particular, it is possible to quickly relay audio signals through ultra-wideband communication without a separate connection between devices. Furthermore, stable wireless audio playback can be performed through ultra-wideband communication.

Meanwhile, the transceiver 135*b* in the audio transmitting device 50 may control the first relay mode or the second relay mode among relay modes to be performed depending on sound quality or data amount.

For example, the transceiver 135*b* in the audio transmitting device 50 may control the first relay mode to be performed, when the sound quality is a low quality that is equal to or lower than a first reference value, or when the amount of transmitting data is equal to or lower than a second reference value.

As another example, the transceiver 135*b* in the second relay mode information INb audio transmitting device 50 may control the second relay mode to be performed, when the sound quality is a high quality exceeding the first reference value, or when the amount of transmitting data is exceeding the second reference value.

Meanwhile, in the case of the first relay mode, the transceiver 135*b* in the audio transmitting device 50 may contain the first relay mode information into the second relay mode information INb media access control layer based on ultra-wideband communication.

In response to this, the transceiver 135 in the first wireless audio receiving device 100*a*1 may extract first relay mode information, based on data in the media access control layer of the received signal.

Meanwhile, in the case of the second relay mode, the transceiver 135*b* in the audio transmitting device 50 may contain the second relay mode information into the second relay mode information INb application layer based on ultra-wideband communication.

In response to this, the transceiver 135 in the first wireless audio receiving device 100*a*1 may extract second relay mode information, based on data in the application layer of the received signal.

Meanwhile, according to the ultra-wideband communication standard, the transceiver 135 in the first wireless audio receiving device 100*a*1 may extract the first relay mode information earlier than the second relay mode information.

Meanwhile, the transceiver 135*b* in the second relay mode information INb audio transmitting device 50 may contain the first relay mode information or the second relay mode information into a header based on ultra-wideband communication.

FIGS. 15A to 16E are diagrams for explaining FIG. 13 or FIG. 14.

Figure 15A:
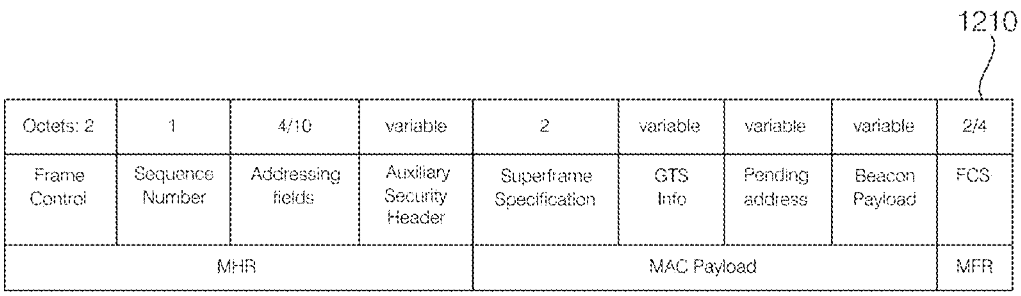
FIGS. 15A to 16E are diagrams for explaining FIG. 13 or FIG. 14.

FIG. 15A illustrates a beacon frame 1210 within a beacon signal of ultra-wideband communication.

Referring to FIG. 15A, the beacon frame 1210 in FIG. 15A(a) includes a frame control, a sequence number, an addressing field, an auxiliary security header, a superframe specification, GTS information, pending address, beacon payload, etc.

Figure 15B:
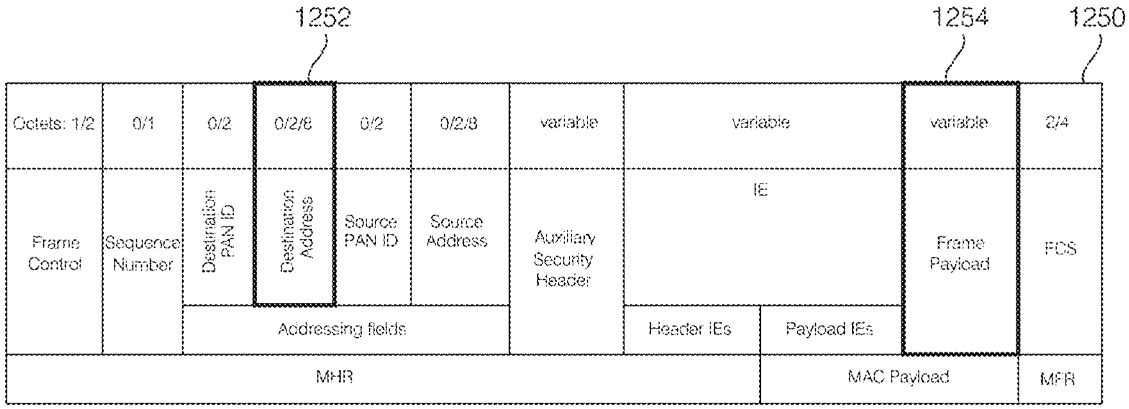

FIG. 15B illustrates a MAC frame 1250 of ultra-wideband communication.

Referring to FIG. 15B, the MAC frame 1250 includes a frame control, a sequence number, a destination PAN ID, a destination address 1252, a source PAN ID, a source address, an auxiliary security header, IE, a frame payload 1354, etc.

The destination address 1252 may include address information of the connected wireless audio receiving device 100*a*.

For example, when the destination address 1252 is '0x1234', it may indicate address information of the first wireless audio receiving device 100*a*1 of the wireless audio receiving device 100*a*, and when the destination address 1252 is '0x4567', it may indicate address information of the second wireless audio receiving device 100*a*2 of the wireless audio receiving device 100*a*.

Meanwhile, in the case of the first relay mode, the destination address 1252 may be address information of the second wireless audio receiving device 100*a*2 having a poor wireless connection state.

Meanwhile, in the case of the second relay mode, the destination address 1252 may be address information of the first wireless audio receiving device 100*a*1 having a good wireless connection state.

The frame payload 1254 may include audio data of a corresponding channel to the connected wireless audio receiving device 100*a*.

For example, in the case of an audio signal of first channel in normal mode, the frame payload 1354 may include audio data for the left channel.

As another example, in the case of an audio signal of second channel in normal mode, the frame payload 1354 may include audio data for the right channel.

Meanwhile, in the case of the first relay mode or the second relay mode, the frame payload 1354 may include audio data for the right channel.

Meanwhile, the frame payload 1354 may include delimiter information for channel classification in order to distinguish audio data for each channel.

For example, in the case of audio sharing mode, the frame payload 1354 may include left channel audio data, delimiter information, and right channel audio data.

Figure 15C:
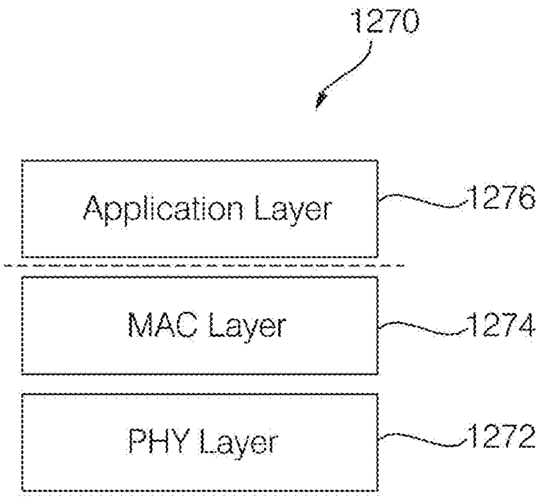

FIG. 15C illustrates a layer structure of ultra-wideband communication.

Referring to ultra-wideband FIG. 15C, communication-based data 1270 may include a physical layer 1272, a media access control (MAC) layer 1274 on the physical layer 1272, and an application layer 1276 on the media access control layer 1274.

Meanwhile, the transceiver 135*b* in the audio transmitting device 50 may add first relay mode information into the media access control layer 1274 in the case of the first relay mode among the relay mode, and may add second relay mode information into the application layer 127 in the case of the second relay mode among relay modes.

Figure 16A:
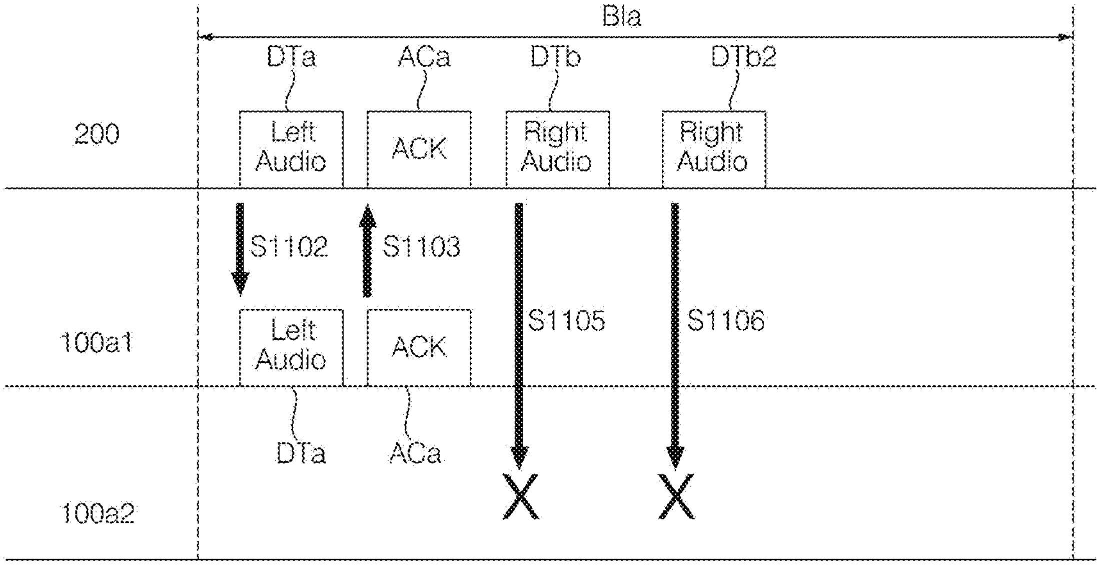

FIG. 16A illustrates that a cradle device, which is an example of a wireless audio transmitting device, transmits an audio signal of first channel and an audio signal of second channel in normal mode.

Referring to FIG. 16A, within the beacon interval BIa, the transceiver 135*b* within the cradle device 200 transmits an audio signal DTa of the first channel (S1102).

In response to this, the transceiver 135 in the first wireless audio receiving device 100*a*1 receives the audio signal DTa of the first channel from the wireless audio transmitting device 50.

Next, the transceiver 135 in the first wireless audio receiving device 100*a*1 may transmit a first confirmation message ACa, after receiving the audio signal DTa of the first channel (S1103).

In response to this, the transceiver 135*b* in the cradle device 200 may receive the first confirmation message ACa from the first wireless audio receiving device 100*a*1, after transmitting the audio signal DTa of the first channel.

Next, the transceiver 135*b* in the cradle device 200 transmits the audio signal DTb of the second channel, after receiving the first confirmation message ACa (S1105).

Meanwhile, if the transceiver 135*b* in the cradle device 200 does not receive a confirmation message from the second wireless audio receiving device 100*a*2 within a predetermined time, it may additionally transmit the audio signal DTb2 of the second channel. (S1106).

Meanwhile, in normal mode, the second wireless audio receiving device 100*a*2 may not receive the audio signal of the second channel, due to the head effect described in FIG. 11.

Figure 16B:
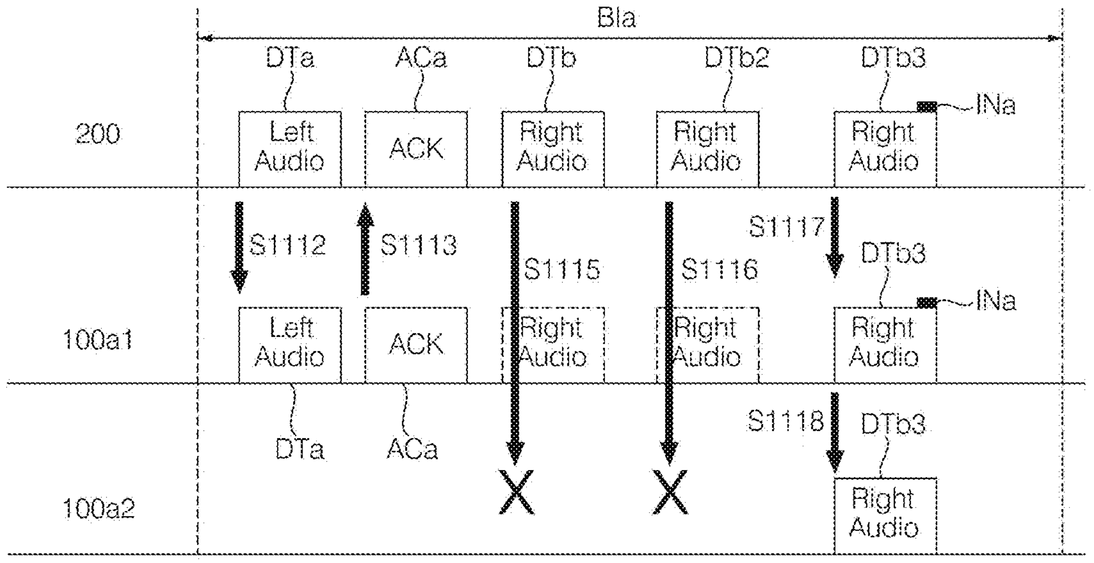

FIG. 16B illustrates switching from normal mode to first relay mode.

Referring to FIG. 16B, within the beacon interval BIa, the transceiver 135*b* in the cradle device 200, which is an example of the wireless audio transmitting device 50, transmits the audio signal DTa of the first channel, in normal mode (S1112).

In response to this, the transceiver 135 in the first wireless audio receiving device 100*a*1 receives the audio signal DTa of the first channel from the wireless audio transmitting device 50.

Next, the transceiver 135 in the first wireless audio receiving device 100*a*1 may transmit a first confirmation message ACa, after receiving the audio signal DTa of the first channel (S1113).

In response to this, the transceiver 135*b* in the cradle device 200 may receive the first confirmation message ACa from the first wireless audio receiving device 100*a*1, after transmitting the audio signal DTa of the first channel.

Next, the transceiver 135*b* in the cradle device 200 transmits the audio signal DTb of the second channel, after receiving the first confirmation message ACa (S1115).

Meanwhile, if the transceiver 135*b* in the cradle device 200 does not receive a confirmation message from the second wireless audio receiving device 100*a*2 within a predetermined time, it may additionally transmit the audio signal DTb2 of the second channel. (S1116).

Meanwhile, the transceiver 135*b* in the cradle device 200 may further switch from the normal mode to the relay mode, if it does not receive a confirmation message from the second wireless audio receiving device 100*a*2 within a predetermined time, after transmitting the audio signal DTb2 of the second channel.

Meanwhile, the transceiver 135*b* in the second relay mode information INb cradle device 200 enters the relay mode, and transmits the audio signal DTb3 of the second channel to the first wireless audio receiving device 100*a*1 (S1117).

Meanwhile, the transceiver 135 in the first wireless audio receiving device 100*a*1 receives the audio signal DTb3 of the second channel from the cradle device 200 according to the second relay mode information INb relay mode, and transmits the audio signal DTb3 of the second channel or the audio signal processed based on the audio signal DTb3 of the second channel to the second wireless audio receiving device 100*a*2.

Meanwhile, the drawing illustrates that the first relay mode among relay modes is performed.

That is, in the case of the first relay mode among the relay mode, the transceiver 135 in the first wireless audio receiving device 100*a*1 may directly transmit the received audio signal DTb3 of the second channel to the second wireless audio receiving device 100*a*2 (S1118).

In response to this, the second wireless audio receiving device 100*a*2 may stably receive the audio signal DTb3 of the second channel from the first wireless audio receiving device 100*a*1.

Accordingly, it is possible to relay audio signals through ultra-wideband communication. In particular, it is possible to quickly relay audio signals through ultra-wideband communication without a separate connection between devices.

Meanwhile, due to the relay mode, the sound output device 160 of the first wireless audio receiving device 100*a*1 outputs a first sound corresponding to the audio signal DTa of the first channel, and the sound output device of the second relay mode information INb second wireless audio receiving device 100*a*2 may output a second sound corresponding to the audio signal DTb3 of the second channel. Eventually, stable wireless audio playback can be achieved through ultra-wideband communication.

Meanwhile, in the relay mode, the transceiver 135*b* in the cradle device 200 may set the target address of the audio signal DTb of the second channel to the first wireless audio receiving device 100_a_1 or the first wireless audio receiving device 100_a_1.

For example, in the case of the first relay mode among relay modes, the transceiver 135_b_ in the cradle device 200 may set the target address of the audio signal DTb of the second channel to the second wireless audio receiving device 100_a_2.

Meanwhile, in the case of the first relay mode among relay modes, the transceiver 135_b_ in the cradle device 200 may not receive a confirmation message within a predetermined time, after transmitting the audio signal DTb3 of the second channel to the first wireless audio receiving device 100_a_1.

Meanwhile, the transceiver 135_b_ in the cradle device 200 may further transmit relay mode information, in a case of transmitting the audio signal DTb3 of the second channel.

In response to this, when receiving the audio signal DTb3 of the second channel, the transceiver 135 in the first wireless audio receiving device 100_a_1 may transmit the audio signal DTb of the second channel intactly to the second wireless audio receiving device 100_a_2, or transmit an audio signal processed based on the audio signal DTb of the second channel to the second wireless audio receiving device 100_a_2, according to the added relay mode information.

For example, the transceiver 135_b_ in the cradle device 200 may further transmit first relay mode information Ina, in a case of transmitting the audio signal DTb3 of the second channel.

Specifically, in the case of the first relay mode among relay modes, the transceiver 135_b_ in the cradle device 200 may add the first relay mode information INa to the media access control layer 1274 to transmit.

In response to this, the transceiver 135 in the first wireless audio receiving device 100_a_1 may extract the first relay mode information INa in the media access control layer 1274.

Further, in the case of the first relay mode, the transceiver 135 in the first wireless audio receiving device 100_a_1 may transmit the audio signal DTb3 of the second channel intactly to the second wireless audio receiving device 100_a_2, based on the data in the media access control layer 1274. Accordingly, it is possible to relay audio signals, through ultra-wideband communication, and through the first relay mode.

Figure 16C:
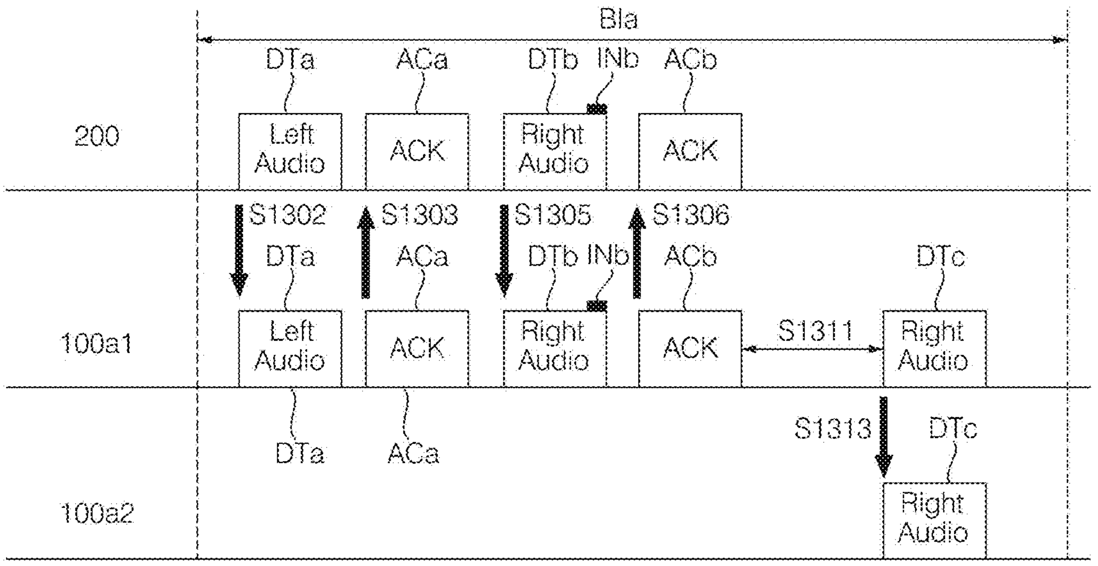

FIG. 16C illustrates switching from a normal mode to a second relay mode.

Referring to FIG. 16C, within the beacon interval BIa, the transceiver 135_b_ in the cradle device 200 transmits the audio signal DTa of the first channel (S1302).

In response to this, the transceiver 135 in the first wireless audio receiving device 100_a_1 receives the audio signal DTa of the first channel from the wireless audio transmitting device 50.

Next, the transceiver 135 in the first wireless audio receiving device 100_a_1 may transmit a first confirmation message ACa, after receiving the audio signal DTa of the first channel (S1303).

In response to this, the transceiver 135_b_ in the cradle device 200 may receive the first confirmation message ACa from the first wireless audio receiving device 100_a_1, after transmitting the audio signal DTa of the first channel.

Next, the transceiver 135_b_ in the cradle device 200 may transmit the audio signal DTb of the second channel, after receiving the first confirmation message ACa (S1305).

At this time, the transceiver 135_b_ in the cradle device 200 may enter the second relay mode among the relay mode and transmit an audio signal DTb of the second channel, based on the wireless network state with the second wireless audio receiving device 100_a_2 or a key input.

Meanwhile, in the second relay mode among relay modes, the transceiver 135_b_ in the cradle device 200 may set the target address of the audio signal DTb of the second channel to the first wireless audio receiving device 100_a_1.

Meanwhile, the transceiver 135_b_ in the cradle device 200 may add the second relay mode information INb in the application layer 1276, in the case of the second relay mode information INb second relay mode among the relay mode.

In response to this, the transceiver 135 in the first wireless audio receiving device 100_a_1 may extract the second relay mode information (INb) in the application layer 1276.

Meanwhile, in the case of the second relay mode among the relay mode, the transceiver 135 in the first wireless audio receiving device 100_a_1 may transmit a second confirmation message ACb to the wireless audio transmitting device 50, after receiving the audio signal DTb of the second channel (S1306).

In response to this, in the case of the second relay mode, the transceiver 135_b_ in the cradle device 200 may receive the second confirmation message ACb, after transmitting the audio signal DTb of the second channel to the first wireless audio receiving device 100_a_1.

Next, in the case of the second relay mode, the transceiver 135 in the second relay mode information INb first wireless audio receiving device 100_a_1 may perform a signal processing based on the audio signal DTb of the second relay mode information INb second channel, after transmitting the second confirmation message (S1311).

In addition, the transceiver 135 in the first wireless audio receiving device 100_a_1 may transmit the processed audio signal DTc to the second wireless audio receiving device 100_a_2 (S1313).

That is, in the case of the second relay mode among the relay mode, the transceiver 135 in the first wireless audio receiving device 100_a_1 may transmit the audio signal DTc processed based on the audio signal DTb of the second channel to the second wireless audio receiving device 100_a_2.

In response to this, the second wireless audio receiving device 100_a_2 may stably receive the audio signal DTc processed based on the audio signal DTb of the second channel, from the first wireless audio receiving device 100_a_1.

Accordingly, it is possible to relay audio signals through ultra-wideband communication. In particular, it is possible to quickly relay audio signals through ultra-wideband communication without a separate connection between devices.

Meanwhile, due to the relay mode, the sound output device 160 of the first wireless audio receiving device 100_a_1 outputs the first sound corresponding to the audio signal DTa of the first channel, and the sound output device of the second relay mode information INb second wireless audio receiving device 100_a_2 may output a second sound corresponding to the audio signal DTc processed based on the audio signal DTb of the second channel. Eventually, stable wireless audio playback can be achieved through ultra-wideband communication.

Figure 16D:
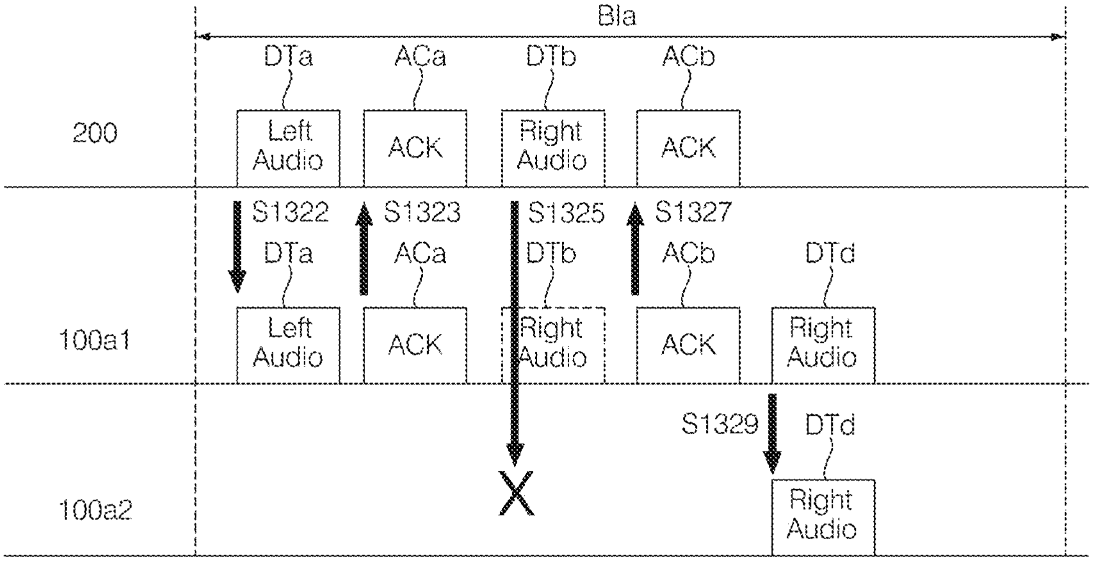

FIG. 16D illustrates an example of a switching from normal mode to relay mode.

Referring to FIG. 16D, within the beacon interval BIa, the transceiver 135_b_ in the cradle device 200 transmits the audio signal DTa of the first channel (S1322).

In response to this, the transceiver 135 in the first wireless audio receiving device 100*a*1 receives the audio signal DTa of the first channel from the wireless audio transmitting device 50.

Next, the transceiver 135 in the first wireless audio receiving device 100*a*1 may transmit a first confirmation message ACa, after receiving the audio signal DTa of the first channel (S1323).

In response to this, the transceiver 135*b* in the cradle device 200 may receive the first confirmation message ACa from the first wireless audio receiving device 100*a*1, after transmitting the audio signal DTa of the first channel.

Next, the transceiver 135*b* in the cradle device 200 may transmit the audio signal DTb of the second channel, after receiving the first confirmation message ACa (S1325).

Meanwhile, the transceiver 135*b* in the cradle device 200 may not receive a confirmation message from the second wireless audio receiving device 100*a*2 within a predetermined time.

At this time, the transceiver 135 in the second INb first wireless audio relay mode information receiving device 100*a*1 may receive the audio signal DTb of the second channel through sniffing.

Then, the transceiver 135 in the first wireless audio receiving device 100*a*1 may transmit a second confirmation message ACb to the wireless audio transmitting device 50, after receiving the audio signal DTb of the second channel through sniffing (S1327).

That is, when receiving the audio signal DTb of the second channel through sniffing, the transceiver 135 in the first wireless audio receiving device 100*a*1 may transmit the audio signal DTb of the second channel or the audio signal DTd processed based on the audio signal DTb of the second relay mode information INb second channel to the second wireless audio receiving device 100*a*2, according to the relay mode (S1329).

In FIG. 16D illustrates that the transceiver 135 in the first wireless audio receiving device 100*a*1 transmits the audio signal DTd processed based on the audio signal DTb of the second channel to the second wireless audio receiving device 100*a*2.

In response to this, the second wireless audio receiving device 100*a*2 may stably receive the audio signal DTb processed based on the audio signal DTb of the second channel, from the first wireless audio receiving device 100*a*1.

Accordingly, it is possible to relay audio signals through ultra-wideband communication. In particular, it is possible to quickly relay audio signals through ultra-wideband communication without a separate connection between devices. Furthermore, a stable wireless audio playback can be performed through ultra-wideband communication.

Figure 16E:
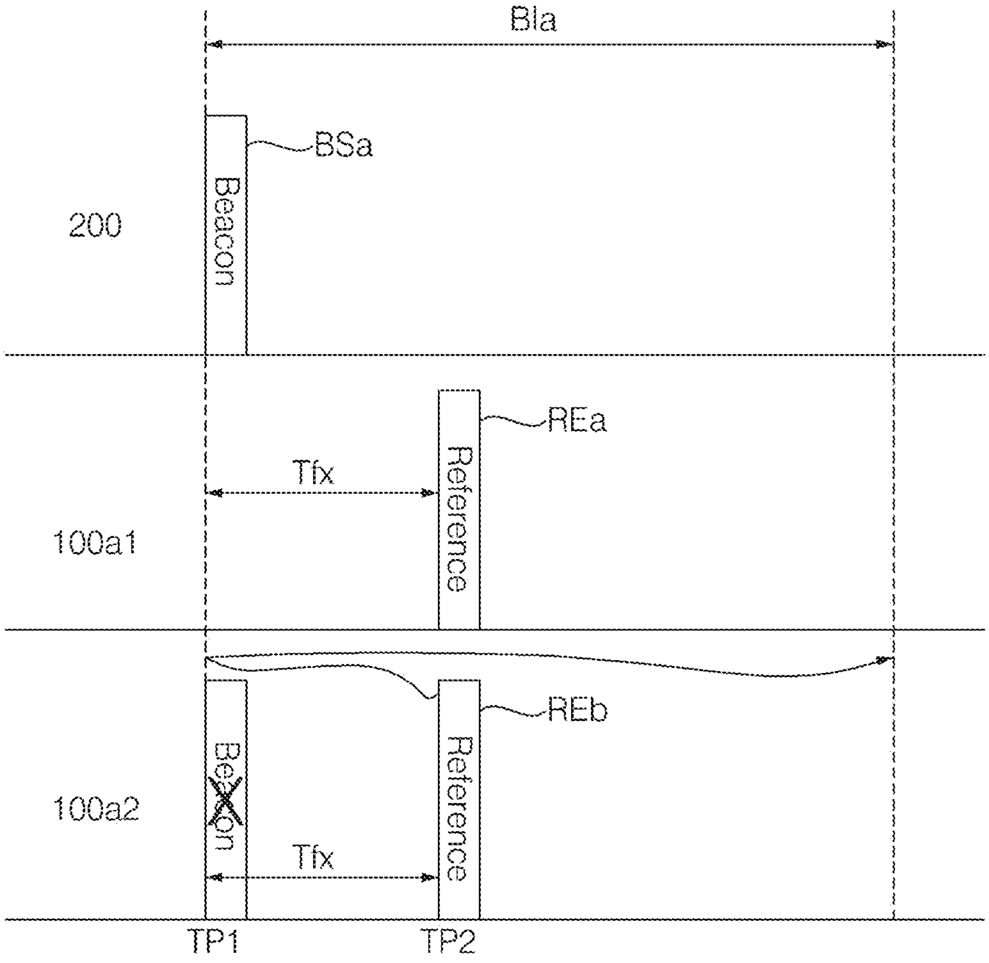

FIG. 16E is a diagram illustrating the operation between the first wireless audio receiving device 100*a*1 and the second wireless audio receiving device 100*a*2, in the relay mode.

Referring to FIG. 16E, the transceiver 135*b* in the cradle device 200 may periodically transmit a beacon signal BSa.

In addition, the transceiver 135*b* in the cradle device 200 may transmit the audio signal of the first channel and the audio signal of the second channel, after transmitting the beacon signal BSa.

Meanwhile, the first wireless audio receiving device 100*a*1 may receive the beacon signal BSa, but the second wireless audio receiving device 100*a*2 may not receive the beacon signal BSa.

Meanwhile, the transceiver 135*b* in the cradle device 200 may receive a confirmation message within a predetermined time from the first wireless audio receiving device 100*a*1, but may not receive a confirmation message within a predetermined time from the second wireless audio receiving device 100*a*2.

Accordingly, the transceiver 135*b* in the cradle device 200 may switch from the normal mode to the relay mode.

Meanwhile, in the relay mode, the transceiver 135 in the first wireless audio receiving device 100*a*1 may receive the audio signal of the second channel, and generate a reference signal REa containing offset information spaced apart by a predetermined interval Tfx from the beacon signal BSa.

In addition, in a case of transmitting the audio signal of the second channel to the second relay mode information INb second wireless audio receiving device 100*a*2, the transceiver 135 in the first wireless audio receiving device 100*a*1 may transmit together with a reference signal REa containing offset information spaced apart by a predetermined interval Tfx from the beacon signal BSa.

For example, in a case of transmitting the audio signal of the second channel intactly to the second wireless audio receiving device 100*a*2, according to the first relay mode, the transceiver 135 in the first wireless audio receiving device 100*a*1 may transmit together with a reference signal REa containing offset information spaced apart by a predetermined interval Tfx from the beacon the signal BSa. Accordingly, it is possible to relay audio signals through ultra-wideband communication.

As another example, according to the second relay mode, in a case of transmitting an audio signal processed based on the audio signal of the second channel to the second wireless audio receiving device 100*a*2, the transceiver 135 in the first wireless audio receiving device 100*a*1 may transmit together with a reference signal REa containing offset information spaced apart by a predetermined interval Tfx from the beacon signal BSa.

In response to this, the second wireless audio receiving device 100*a*2 may receive, from the first wireless audio receiving device 100*a*1, an audio signal of the second channel or an audio signal processed based on the audio signal of the second channel, and output a sound corresponding to the audio signal of the second channel or the audio signal processed based on the audio signal of the second channel, based on the reference signal REb received together.

Accordingly, even if the second wireless audio receiving device 100*a*2 does not receive a beacon signal, it can stably output sound in synchronization with the first wireless audio receiving device 100*a*1 or the cradle device 200.

Meanwhile, FIGS. 16A to 16E illustrate the cradle device 200 as an example of the wireless audio transmitting device 50, but it is not limited thereto, and a mobile terminal 600 can also be used as another example of the wireless audio transmitting device 50.

Meanwhile, FIGS. 16A to 16E illustrate a wireless earphone as the first wireless audio receiving device 100*a*1 and the second wireless audio receiving device 100*a*2, but it is not limited thereto, and the first wireless audio receiving device 100*a*1 and the second wireless audio receiving device 100*a*2 may be a wireless audio receiving device for each channel, such as those shown in FIGS. 1C to 1D.

As described above, a wireless audio receiving device according to an embodiment of the present disclosure includes: a transceiver configured to receive an audio signal from a wireless audio transmitting device through ultra-wideband communication; and a sound output device configured to output sound corresponding to the audio signal from the transceiver, wherein the transceiver receives an audio signal of a first channel from the wireless audio transmitting device, and, based on a relay mode, receives an audio signal of a second channel from the wireless audio transmitting device, and transmits the audio signal of the second channel or an audio signal processed based on the audio signal of the second channel to a second wireless audio receiving device. Accordingly, it is possible to relay audio signals through ultra-wideband communication. In particular, it is possible to quickly relay audio signals through ultra-wideband communication without a separate connection between devices. Furthermore, stable wireless audio playback can be performed through ultra-wideband communication.

Meanwhile, the transceiver may transmit a first confirmation message to the wireless audio transmitting device, after receiving the audio signal of the first channel. Accordingly, it is possible to stably receive audio signals through ultra-wideband communication.

Meanwhile, in the case of a first relay mode among the relay mode, the transceiver may transmit the audio signal of the second channel intactly to the second wireless audio receiving device. Accordingly, it is possible to relay audio signals through ultra-wideband communication.

Meanwhile, in a case of a second relay mode among the relay mode, the transceiver may transmit an audio signal processed based on the audio signal of the second channel to the second wireless audio receiving device. Accordingly, it is possible to relay audio signals through ultra-wideband communication.

Meanwhile, in a case of a second relay mode among the relay mode, the transceiver may transmit a second confirmation message to the wireless audio transmitting device, after receiving the audio signal of the second channel, and transmit an audio signal processed based on the audio signal of the second channel to the second wireless audio receiving device, after transmitting the second confirmation message. Accordingly, it is possible to relay audio signals through ultra-wideband communication.

Meanwhile, based on added relay mode information while receiving the audio signal of the second channel, the transceiver may transmit the audio signal of the second channel intactly to the second wireless audio receiving device, or transmit an audio signal processed based on the audio signal of the second channel to the second wireless audio receiving device. Accordingly, it is possible to relay audio signals through ultra-wideband communication.

Meanwhile, in a case of a first relay mode, the transceiver may transmit the audio signal of the second channel intactly to the second wireless audio receiving device, based on data in a media access control layer, and in a case of a second relay mode, transmit an audio signal processed based on the audio signal of the second channel to the second wireless audio receiving device, based on data in an application layer. Accordingly, it is possible to relay audio signals through ultra-wideband communication.

Meanwhile, in a case of transmitting the audio signal of the second channel intactly to the second wireless audio receiving device, the transceiver may transmit together with a reference signal including offset information spaced apart by a predetermined interval from a beacon signal. Accordingly, it is possible to relay audio signals through ultra-wideband communication.

Meanwhile, in a case of transmitting an audio signal processed based on the audio signal of the second channel to the second wireless audio receiving device, the transceiver may transmit together with a reference signal including offset information spaced apart by a predetermined interval from a beacon signal. Accordingly, it is possible to relay audio signals through ultra-wideband communication.

A wireless audio transmitting device according to an embodiment of the present disclosure includes: a transceiver configured to transmit an audio signal to at least one wireless audio receiving device through ultra-wideband communication, wherein the transceiver transmits an audio signal of a first channel to a first wireless audio receiving device, and transmits an audio signal of a second channel to a second wireless audio receiving device, and in case in which a confirmation message is not received from the second wireless audio receiving device within a predetermined time, enters a relay mode and transmits the audio signal of the second channel to the first wireless audio receiving device. Accordingly, it is possible to relay audio signals through ultra-wideband communication. In particular, it is possible to quickly relay audio signals through ultra-wideband communication without a separate connection between devices.

Meanwhile, in the relay mode, the transceiver may set a target address of the audio signal of the second channel to the first wireless audio receiving device or the first wireless audio receiving device. Accordingly, it is possible to relay audio signals through ultra-wideband communication.

Meanwhile, in a case of a first relay mode among the relay mode, the transceiver may set a target address of the audio signal of the second channel to the second wireless audio receiving device, and, in a case of a second relay mode among the relay mode, set a target address of the audio signal of the second channel to the first wireless audio receiving device. Accordingly, it is possible to relay audio signals through ultra-wideband communication.

Meanwhile, the transceiver may receive a first confirmation message from the first wireless audio receiving device, after transmitting the audio signal of the first channel. Accordingly, it is possible to relay audio signals through ultra-wideband communication.

Meanwhile, in a case of a first relay mode among the relay mode, the transceiver may not receive a confirmation message within a predetermined time, after transmitting the audio signal of the second channel to the first wireless audio receiving device, and, in a case of a second relay mode among the relay mode, receive a second confirmation message, after transmitting the audio signal of the second channel to the first wireless audio receiving device. Accordingly, it is possible to relay audio signals through ultra-wideband communication.

Meanwhile, wherein the transceiver may further transmit relay mode information, in a case of transmitting the audio signal of the second channel. Accordingly, it is possible to relay audio signals through ultra-wideband communication.

Meanwhile, in a case of a first relay mode among the relay mode, the transceiver may add first relay mode information to a media access control layer, and, in a case of a second relay mode among the relay mode, add second relay mode information in an application layer. Accordingly, it is possible to relay audio signals through ultra-wideband communication.

A wireless audio output system according to an embodiment of the present disclosure includes: a wireless audio receiving device and a wireless audio transmitting device, wherein the wireless audio receiving device includes a transceiver for receiving an audio signal from a wireless audio transmitting device through an ultra-wideband communication, and a sound output device for outputting a sound corresponding to the audio signal from the transceiver, wherein the transceiver: receives an audio signal of a first channel from the wireless audio transmitting device; receives an audio signal of a second channel from the wireless audio transmitting device, based on a relay mode; and transmits the audio signal of the second channel or an audio signal processed based on the audio signal of the second channel to a second wireless audio receiving device. Accordingly, it is possible to relay audio signals through ultra-wideband communication. In particular, it is possible to quickly relay audio signals through ultra-wideband communication without a separate connection between devices. Furthermore, stable wireless audio playback can be performed through ultra-wideband communication.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. A wireless audio receiving device comprising:

a transceiver configured to receive an audio signal from a wireless audio transmitting device through ultra-wideband communication; and a sound output device configured to output sound corresponding to the audio signal from the transceiver, wherein the transceiver receives an audio signal of a first channel from the wireless audio transmitting device, and, based on a relay mode, receives an audio signal of a second channel from the wireless audio transmitting device, and transmits the audio signal of the second channel or an audio signal processed based on the audio signal of the second channel to a second wireless audio receiving device, and wherein, in a case of a first relay mode, the transceiver transmits the audio signal of the second channel intactly to the second wireless audio receiving device, based on data in a media access control layer, and in a case of a second relay mode, transmits an audio signal processed based on the audio signal of the second channel to the second wireless audio receiving device, based on data in an application layer.

2. The wireless audio receiving device of claim 1, wherein the transceiver transmits a first confirmation message to the wireless audio transmitting device, after receiving the audio signal of the first channel.

3. The wireless audio receiving device of claim 1, wherein, in a case of a first relay mode among the relay mode, the transceiver transmits the audio signal of the second channel intactly to the second wireless audio receiving device.

4. The wireless audio receiving device of claim 1, wherein, in a case of a second relay mode among the relay mode, the transceiver transmits an audio signal processed based on the audio signal of the second channel to the second wireless audio receiving device.

5. The wireless audio receiving device of claim 1, wherein, in a case of a second relay mode among the relay mode, the transceiver transmits a second confirmation message to the wireless audio transmitting device, after receiving the audio signal of the second channel, and transmits an audio signal processed based on the audio signal of the second channel to the second wireless audio receiving device, after transmitting the second confirmation message.

6. The wireless audio receiving device of claim 1, wherein, based on added relay mode information while receiving the audio signal of the second channel, the transceiver transmits the audio signal of the second channel intactly to the second wireless audio receiving device, or transmits an audio signal processed based on the audio signal of the second channel to the second wireless audio receiving device.

7. The wireless audio receiving device of claim 1, wherein, in a case of transmitting the audio signal of the second channel intactly to the second wireless audio receiving device, the transceiver transmits together with a reference signal including offset information spaced apart by a predetermined interval from a beacon signal.

8. The wireless audio receiving device of claim 1, wherein, in a case of transmitting an audio signal processed based on the audio signal of the second channel to the second wireless audio receiving device, the transceiver transmits together with a reference signal including offset information spaced apart by a predetermined interval from a beacon signal.

9. A wireless audio transmitting device comprising a transceiver configured to transmit an audio signal to at least one wireless audio receiving device through ultra-wideband communication, wherein the transceiver transmits an audio signal of a first channel to a first wireless audio receiving device, and transmits an audio signal of a second channel to a second wireless audio receiving device, and in case in which a confirmation message is not received from the second wireless audio receiving device within a predetermined time, enters a relay mode and transmits the audio signal of the second channel to the first wireless audio receiving device, wherein the transceiver is configured to:

determine whether transmission of the audio signal of the second channel is necessary, after entering the relay mode, in response to transmission of the audio signal of the second channel being necessary, based on a first relay mode among the relay mode, add first relay mode information to a media access control layer, and, in response to transmission of the audio signal of the second channel not being necessary, based on a second relay mode among the relay mode, add second relay mode information in an application layer.

10. The wireless audio transmitting device of claim 9, wherein, in the relay mode, the transceiver sets a target address of the audio signal of the second channel to the first wireless audio receiving device or the first wireless audio receiving device.

11. The wireless audio transmitting device of claim 9, wherein, in a case of the first relay mode among the relay mode, the transceiver sets a target address of the audio signal of the second channel to the second wireless audio receiving device, and, in a case of the second relay mode among the relay mode, sets a target address of the audio signal of the second channel to the first wireless audio receiving device.

12. The wireless audio transmitting device of claim 9, wherein the transceiver receives a first confirmation message from the first wireless audio receiving device, after transmitting the audio signal of the first channel.

13. The wireless audio transmitting device of claim 9, wherein, in a case of a first relay mode among the relay mode, the transceiver does not receive a confirmation message within a predetermined time, after transmitting the audio signal of the second channel to the first wireless audio receiving device, and, in a case of a second relay mode among the relay mode, receives a second confirmation message, after transmitting the audio signal of the second channel to the first wireless audio receiving device.

14. The wireless audio transmitting device of claim 9, wherein the transceiver further transmits relay mode information, in a case of transmitting the audio signal of the second channel.

15. A wireless audio output system comprising:

a wireless audio receiving device; and a wireless audio transmitting device, wherein the wireless audio receiving device comprises:

a transceiver configured to receive an audio signal from a wireless audio transmitting device through ultra-wideband communication; and a sound output device configured to output sound corresponding to the audio signal from the transceiver, wherein the transceiver receives an audio signal of a first channel from the wireless audio transmitting device, and, based on a relay mode, receives an audio signal of a second channel from the wireless audio transmitting device, and transmits the audio signal of the second channel or an audio signal processed based on the audio signal of the second channel to a second wireless audio receiving device, and wherein, in a case of a first relay mode, the transceiver transmits the audio signal of the second channel intactly to the second wireless audio receiving device, based on data in a media access control layer, and in a case of a second relay mode, transmits an audio signal processed based on the audio signal of the second channel to the second wireless audio receiving device, based on data in an application layer.

16. The wireless audio output system of claim 15, wherein the wireless audio transmitting device comprises a second transceiver configured to transmit an audio signal to at least one wireless audio receiving device through ultra-wideband communication, wherein the second transceiver transmits an audio signal of a first channel to a first wireless audio receiving device, and transmits an audio signal of a second channel to a second wireless audio receiving device, and in case in which a confirmation message is not received from the second wireless audio receiving device within a predetermined time, enters a relay mode and transmits the audio signal of the second channel to the first wireless audio receiving device.

17. The wireless audio output system of claim 16, wherein, in the relay mode, the second transceiver sets a target address of the audio signal of the second channel to the first wireless audio receiving device or the first wireless audio receiving device.

18. The wireless audio output system of claim 16, wherein, in a case of a first relay mode among the relay mode, the second transceiver sets a target address of the audio signal of the second channel to the second wireless audio receiving device, and, in a case of a second relay mode among the relay mode, sets a target address of the audio signal of the second channel to the first wireless audio receiving device.

* * * * *